United States Patent
Hase et al.

(10) Patent No.: US 12,045,065 B2
(45) Date of Patent: Jul. 23, 2024

(54) TRAVELING CONTROL DEVICE

(71) Applicant: DENSO CORPORATION, Kariya (JP)

(72) Inventors: Tomomi Hase, Kariya (JP); Noriaki Ikemoto, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 16/786,149

(22) Filed: Feb. 10, 2020

(65) Prior Publication Data
US 2020/0233437 A1 Jul. 23, 2020

Related U.S. Application Data

(63) Continuation of application No. PCT/JP2018/027815, filed on Jul. 25, 2018.

(30) Foreign Application Priority Data

Aug. 10, 2017 (JP) .................................. 2017-155258
Jul. 11, 2018 (JP) .................................. 2018-131625

(51) Int. Cl.
G05D 1/00 (2024.01)
B60W 40/12 (2012.01)
B60W 60/00 (2020.01)

(52) U.S. Cl.
CPC ............ *G05D 1/0291* (2013.01); *B60W 40/12* (2013.01); *B60W 60/0025* (2020.02)

(58) Field of Classification Search
CPC ........ G05D 1/02; G05D 1/021; G05D 1/0287; G05D 1/0291; G05D 1/0293;
(Continued)

(56) References Cited

U.S. PATENT DOCUMENTS 6,313,758 B1 * 11/2001 Kobayashi .......... G05D 1/0295
701/29.2
6,356,820 B1 3/2002 Hashimoto et al.
(Continued)

FOREIGN PATENT DOCUMENTS

JP   H11-149600 A   6/1999
JP   2000-331296 A  11/2000
(Continued)

OTHER PUBLICATIONS

Oct. 2, 2018 Search Report issued in International Patent Application No. PCT/JP2018/027815.

*Primary Examiner* — Khoi H Tran
*Assistant Examiner* — Sarah A Tran
(74) *Attorney, Agent, or Firm* — Oliff PLC

(57) ABSTRACT

A traveling control device includes: a peripheral recognition unit which recognizes a status around an own vehicle; an abnormality determination unit which determines whether an abnormality has occurred in the recognition function of the peripheral recognition unit; and a control unit which, if the abnormality determination unit has determined that an abnormality has occurred in the recognition function of the peripheral recognition unit, executes procedure modification control to modify an automatic driving procedure in the automatic driving system in accordance with an abnormality recognition direction which is a direction in which the abnormality in the recognition function has occurred.

14 Claims, 22 Drawing Sheets

(58) Field of Classification Search
CPC .. G05D 1/0295; B60W 30/165; B60W 40/12; B60W 60/00; B60W 60/0015; B60W 60/0018; B60W 60/0025; B60W 60/00186; B60W 2556/45; B60W 2556/65; B60W 50/00; B60W 50/04; B60W 50/02; B60W 50/029; H04W 4/30; H04W 4/40; H04W 4/46; G08G 1/00; G08G 1/22; Y02T 10/60; Y02T 10/72
USPC .......................................................... 700/23
See application file for complete search history.

(56) References Cited

U.S. PATENT DOCUMENTS

| | | | |
|---|---|---|---|
| 9,669,842 B2* | 6/2017 | Matsumoto | B60W 50/045 |
| 2010/0208073 A1 | 8/2010 | Hattori | |
| 2010/0256852 A1* | 10/2010 | Mudalige | G08G 1/164 |
| | | | 701/24 |
| 2014/0107867 A1* | 4/2014 | Yamashiro | B60W 40/06 |
| | | | 701/2 |
| 2016/0004254 A1 | 1/2016 | Matsumoto et al. | |
| 2017/0153644 A1 | 6/2017 | Otsuka et al. | |
| 2017/0344023 A1* | 11/2017 | Laubinger | B60W 30/165 |
| 2021/0094464 A1* | 4/2021 | Aono | B60Q 1/507 |

FOREIGN PATENT DOCUMENTS

| | | | |
|---|---|---|---|
| JP | 2003-217074 A | | 7/2003 |
| JP | 2014-153950 A | | 8/2014 |
| JP | 2017-62700 A | | 3/2017 |
| JP | 2017062700 A | * | 3/2017 |

\* cited by examiner (A)   (B)

FIG.15
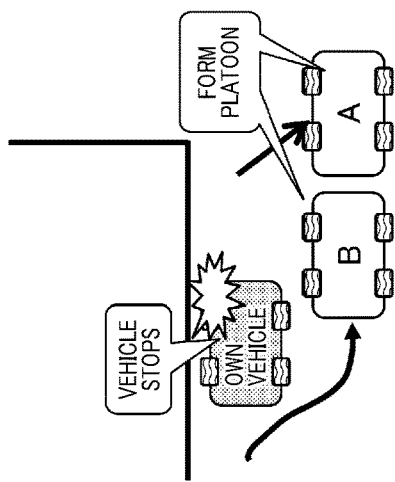
(C)
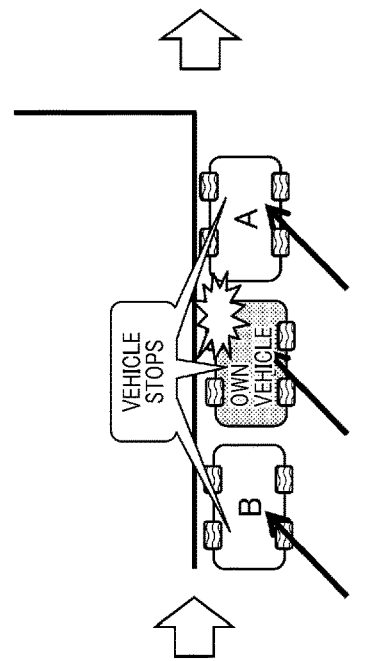
(B)
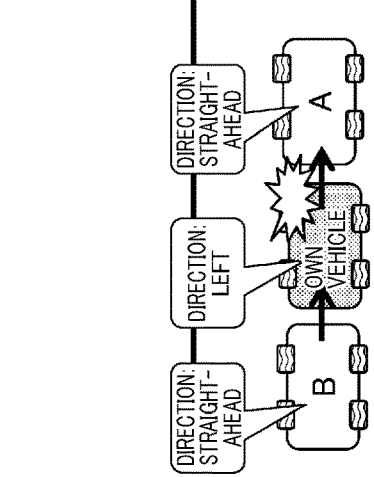
(A)

TRAVELING CONTROL DEVICE

CROSS-REFERENCE TO RELATED APPLICATION

This application is the U.S. bypass application of International Application No. PCT/JP2018/027815 filed Jul. 25, 2018 which designated the U.S. and claims priority to Japanese Patent Applications No. 2017-155258 filed Aug. 10, 2017 and No. 2018-131625 filed Jul. 11, 2018, the contents of which are incorporated herein by reference.

TECHNICAL FIELD

The present disclosure relates to a traveling control device applied to an automatic driving system of a vehicle.

BACKGROUND

As one example of invention intended to reduce the possibility that, in a case where an abnormality has occurred in functions to recognize the surroundings of the vehicle, a driver may drive the vehicle forcefully, the invention described in JP 2010-188902 A has been proposed. In JP 2010-188902 A, upon detection of a failure in the function of displaying a video image acquired by a camera on a display device, when the vehicle is traveling, the vehicle is stopped, and thereafter the operation thereof is prohibited.

SUMMARY

In a traveling control device applied to an automatic driving system according to an aspect of the present disclosure, the traveling control device includes a peripheral recognition unit which recognizes a status around an own vehicle; an abnormality determination unit which determines whether an abnormality has occurred in a recognition function of the peripheral recognition unit; and a control unit which, if the abnormality determination unit has determined that an abnormality has occurred in the recognition function of the peripheral recognition unit, executes procedure modification control to modify an automatic driving procedure in the automatic driving system in accordance with an abnormality recognition direction which is a direction in which the abnormality in the recognition function has occurred.

The abnormality determination unit executes a platooning determination process to determine whether the own vehicle in which the abnormality has occurred is platooning, the control unit executes the procedure modification control in accordance with a result of the platooning determination process, and in response to the result of the platooning determination process indicating that the own vehicle is platooning, the control unit sets a position of the own vehicle in a platoon so that any other vehicle forming the platoon can assist recognition in the abnormality recognition direction.

BRIEF DESCRIPTION OF THE DRAWINGS

The above objects and other objects, features and advantages of the present disclosure will be made clearer by the following detailed description, given referring to the appended drawings. In the accompanying drawings:

FIG. 15 is a view for supplementing the explanation of the flow chart in FIG. 14;

DETAILED DESCRIPTION OF THE PREFERRED EMBODIMENTS

Figure 1:
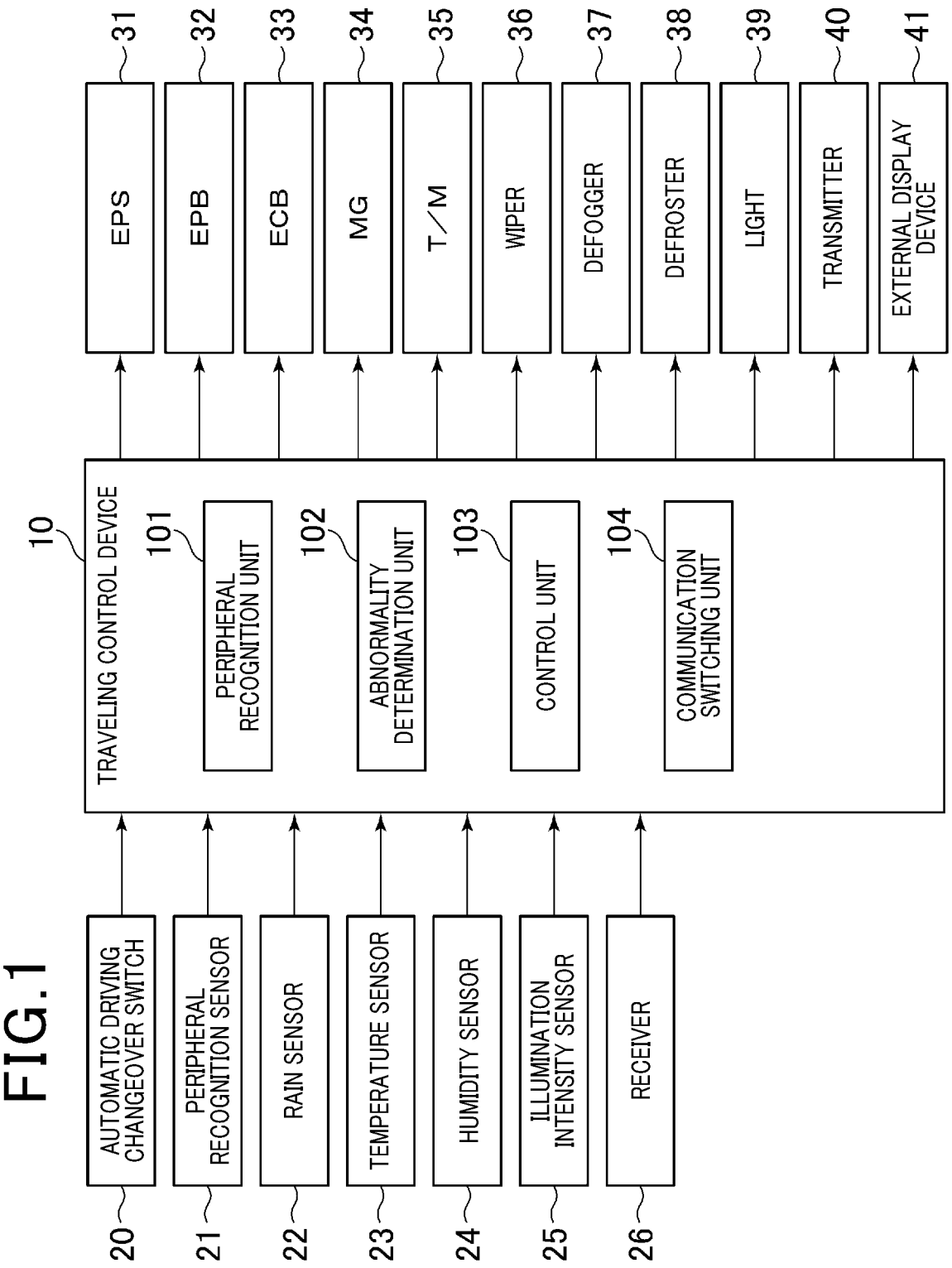
FIG. 1 is a block configuration diagram showing the functional configuration of a traveling control device which is an embodiment of the present disclosure.

If the invention described in JP 2010-188902 A is applied to an automatic driving system, in response to an abnormality in the functions to recognize the surroundings of the vehicle, the vehicle is stopped, and thereafter the operation thereof is prohibited. However, the continuation of the operation of the vehicle may be preferred, depending on the surrounding status. In a case of the vehicle to which the automatic driving system is applied, it is assumed that a driver may not pay much attention to the driving status. Therefore, special considerations should be taken to stop the vehicle when an abnormality has occurred in the surroundings recognition function.

An object of the present disclosure is to provide a traveling control device which can perform procedures adapted to an automatic driving system in response to an abnormality occurred in the function of recognizing a status around an own vehicle.

In a traveling control device applied to an automatic driving system according to an aspect, the traveling control device includes a peripheral recognition unit which recognizes a status around an own vehicle; an abnormality determination unit which determines whether an abnormality has occurred in the recognition function of the peripheral recognition unit; and a control unit which, if the abnormality determination unit has determined that an abnormality has occurred in the recognition function of the peripheral recognition unit, executes procedure modification control to modify an automatic driving procedure in the automatic driving system in accordance with an abnormality recognition direction which is a direction in which the abnormality in the recognition function has occurred.

The abnormality determination unit executes a platooning determination process to determine whether the own vehicle in which the abnormality has occurred is platooning, and the control unit executes the procedure modification control in accordance with a result of the platooning determination process; and in response to the result of the platooning determination process indicating that the own vehicle is platooning, the control unit sets a position of the own vehicle in a platoon so that any other vehicle forming the platoon can assist recognition in the abnormality recognition direction.

Even when an abnormality has occurred in the recognition function of the peripheral recognition unit, the automatic driving procedure is modified in accordance with the abnormality recognition direction, thereby enabling function assist in accordance with the direction in which the abnormality has occurred in the recognition function.

Hereinafter, the present embodiments will be described with reference to the accompanying drawings. In order to facilitate the understanding of the description, the same components are denoted by the same reference numerals as much as possible in the respective drawings, and redundant description is omitted.

A traveling control device 10 will be described with reference to FIG. 1. Information output from an automatic driving changeover switch 20, a peripheral recognition sensor 21, a rain sensor 22, a temperature sensor 23, a humidity sensor 24, an illumination intensity sensor 25, and a receiver 26 is input to the traveling control device 10.

When the automatic driving changeover switch 20 is operated, information indicating that the driving shifts to automatic driving or information indicating that the automatic driving is canceled is input to the traveling control device 10. The peripheral recognition sensor 21 is a recognition device for recognizing the status around an own vehicle equipped with the traveling control device 10, and includes a camera, a LIDAR, a millimeter-wave radar, a sonar, and the like. The status around the own vehicle includes the states of a road and white lines and the state of any other vehicle traveling on the road. The peripheral recognition sensor 21 recognizes the status around the own vehicle and outputs the information about the status to the traveling control device 10.

The rain sensor 22 is a sensor for detecting the presence or absence of rainfall. The rain sensor 22 outputs the information about the detected rainfall to the traveling control device 10. The temperature sensor 23 is a sensor for detecting the temperature outside a vehicle. The temperature sensor 23 outputs the information about the detected temperature to the traveling control device 10. The humidity sensor 24 is a sensor for detecting the humidity outside a vehicle. The humidity sensor 24 outputs the information about the detected humidity to the traveling control device 10.

The illumination intensity sensor 25 is a sensor for detecting the illumination intensity outside a vehicle. The illumination intensity sensor 25 outputs the information about the detected illumination intensity to the traveling control device 10. The receiver 26 is a device which receives the information transmitted through a network. The receiver 26 outputs the received information to the traveling control device 10.

The traveling control device 10 outputs instruction signals to an EPS 31, an EPB 32, an ECB 33, a MG 34, a transmission 35, a wiper 36, a defogger 37, a defroster 38, a light 39, a transmitter 40, and an external display device 41.

The EPS 31 is an electric power steering. The EPS 31 generates steering auxiliary force in accordance with an instruction signal output from the traveling control device 10. The EPB 32 is an electric parking brake. The EPB 32 locks or releases the parking brake in accordance with an instruction signal output from the traveling control device 10. The ECB 33 is an electronically controlled brake system. The ECB 33 generates braking force in accordance with an instruction signal output from the traveling control device 10.

The MG 34 is a motor generator. The MG 34 generates driving force in accordance with an instruction signal output from the traveling control device 10, and, on the other hand, can generate power. The transmission 35 controls a gear change in accordance with an instruction signal output from the traveling control device 10. The wiper 36 is a precipitation removal device which is provided on a front windshield or a rear windshield. The wiper 36 is driven in accordance with an instruction signal output from the traveling control device 10.

The defogger 37 is a heating wire for removing fogging of the rear windshield. The defogger 37 is energized to generate heat in accordance with an instruction signal output from the traveling control device 10, thereby removing fogging of a rear glass. The defroster 38 blows warm air for removing fogging of the front windshield. The defroster 38 blows warm air in accordance with an instruction signal output from the traveling control device 10.

The light 39 is an illumination device which illuminates the front side of a vehicle. The light 39 is turned on/off in accordance with an instruction signal from the traveling control device 10. The transmitter 40 is a device which transmits the information transmitted via a network. The transmitter 40 transmits the information output from the traveling control device 10. The external display device 41 is a device which displays information toward the outside of a vehicle. The external display device 41 performs display based on the information output from the traveling control device 10.

The traveling control device 10 is configured as a computer which is provided with an arithmetic unit such as CPU, storage units such as RAM and ROM, and an interface unit for receiving/transmitting data, as hardware components.

Next, functional components of the control device will be described. The traveling control device 10 is provided with a peripheral recognition unit 101, an abnormality determination unit 102, a control unit 103, and a communication switching unit 104 as functional components.

The peripheral recognition unit 101 is a portion which recognizes the status around the own vehicle. More specifically, it recognizes the status around the own vehicle based on the information output from the peripheral recognition sensor 21.

The abnormality determination unit 102 is a portion which determines whether an abnormality has occurred in the recognition function of the peripheral recognition unit 101. When an abnormality has occurred in the recognition function of the peripheral recognition unit 101, the abnormality determination unit 102 outputs the information to the control unit 103.

If the abnormality determination unit 102 has determined that an abnormality has occurred in the recognition function of the peripheral recognition unit 101, the control unit 103 executes procedure modification control to modify an automatic driving procedure in the automatic driving system in accordance with an abnormality recognition direction which is a direction in which the abnormality in the recognition function has occurred.

The communication switching unit 104 is a portion which switches a communication means with any other vehicle. The communication switching unit 104 executes a communication switching process to enable communication using mobile communication along with the execution of the procedure modification control by the control unit 103. The communication switching unit 104 can increase communication priority of the own vehicle in the execution of the communication switching process.

In the present embodiment, even when an abnormality has occurred in the recognition function of the peripheral recognition unit 101 in this manner, the automatic driving procedure is modified in accordance with the abnormality recognition direction, thereby enabling function assist in accordance with the direction in which the abnormality has occurred in the recognition function.

Further, in the present embodiment, the control unit 103 executes the procedure modification control in accordance with the abnormality recognition direction and the state of any other vehicle capable of recognizing the abnormality recognition direction. The control unit 103 determines the state of the other vehicle capable of recognizing the abnormality recognition direction, and thus can appropriately assist the recognition function in the abnormality recognition direction.

Furthermore, in the present embodiment, the control unit 103 receives a recognition result in the abnormality recognition direction from the other vehicle, and executes the procedure modification control based on this received recognition result. The control unit 103 receives the recognition result of the other vehicle capable of recognizing the abnormality recognition direction, and executes the procedure modification control, so that the function of recognition in the abnormality recognition direction can be assisted and traveling by the automatic driving system can be continued. In the reception of the recognition result in the abnormality recognition direction from the other vehicle, the control unit 103 may receive the recognition result directly through inter-vehicle communication from the other vehicle or via a network. In the reception of the recognition result in the abnormality recognition direction via the network, the control unit 103 may receive the recognition result via a control center connected to the network.

Moreover, in the present embodiment, the control unit 103 receives the recognition result from the other vehicle, and controls the traveling mode of the own vehicle and/or the other vehicle so that the recognition in the abnormality recognition direction can continue to be assisted based on the received recognition result. More specifically, the control unit 103 can directly control the traveling mode of the own vehicle so that the recognition in the abnormality recognition direction can continue to be assisted based on the received recognition result. Further, the control unit 103 can transmit information for indirectly controlling the traveling mode to the other vehicle so that the recognition in the abnormality recognition direction continues to be assisted based on the received recognition result. Execution of such control can keep the positional relationship between the other vehicle and the own vehicle so that the recognition result of the other vehicle which supplies the recognition result can be used, thereby making it possible to continue traveling by the automatic driving system.

Further, in the present embodiment, the abnormality determination unit 102 executes a platooning determination process to determine whether the own vehicle in which the abnormality has occurred is platooning, and the control unit 103 executes procedure modification control in accordance with the result of the platooning determination process. When the own vehicle is platooning, the possibility is increased that recognition assist can be performed using the recognition result of any other vehicle constituting the platooning. In this aspect, the control unit executes the procedure modification control in accordance with a result of the platooning determination process, and thus enables the procedure modification control using platooning.

Furthermore, in the present embodiment, when the result of the platooning determination process indicates that the own vehicle is platooning, the control unit 103 sets the position of the own vehicle in the platoon so that any other vehicle forming the platoon can assist recognition in the abnormality recognition direction. The position of the own vehicle relative to the other platooning vehicle is set so that the other vehicle forming the platoon can assist recognition in the abnormality recognition direction, thereby making it possible to further enhance the possibility that the recognition result of the other vehicle can be utilized.

When the own vehicle has a front recognition abnormality, the position of the own vehicle is preferably set to be the second or subsequent from the head of the platoon. When the own vehicle has a rear recognition abnormality, the position of the own vehicle is preferably set to be the second or subsequent from the tail of the platoon. When the own vehicle has a side recognition abnormality, the position of the own vehicle is preferably set to be the second or subsequent from the head of the platoon and the second or subsequent from the tail of the platoon.

Furthermore, in the present embodiment, the control unit 103, when changing the position of the own vehicle in the platoon, causes the other vehicle to change lanes without causing the own vehicle to change lanes. Since the own vehicle can change its own position in the platoon without changing lanes, it is possible to perform optimum platooning while securing the safety of the own vehicle in which the abnormality in recognition has occurred.

Moreover, in the present embodiment, the control unit 103, when changing the position of the own vehicle in the platoon, causes the own vehicle to change lanes in accordance with the abnormality recognition direction. When the control unit 103 causes the other vehicle to change lanes without causing the own vehicle in which the abnormality has occurred to change lanes, a passenger of the other vehicle may feel discomfort in some cases. So, optimum platooning can be performed without causing discomfort to the passenger of the other vehicle by causing the own vehicle in which the abnormality has occurred to change lanes to change the position of the own vehicle in the platoon.

Further, in the present embodiment, when the result of the platooning determination process indicates that the own vehicle is not platooning, the control unit 103 performs control so that the own vehicle platoons with other vehicles capable of assisting recognition in the abnormality recognition direction. Even when the own vehicle is not platooning, the control unit 103 performs control so that the own vehicle is platooning with the other vehicle capable of assisting recognition in the abnormality recognition direction, thereby enabling the procedure modification control using platooning.

Furthermore, in the present embodiment, the control unit 103, when detecting any other vehicle capable of platooning, outputs platooning request information to request the other vehicle to platoon. The control unit 103 outputs the platooning request information, thereby making it possible to identify the other platooning vehicle and to perform platooning with the other vehicle. The other vehicle capable of platooning is any other vehicle capable of inter-vehicle communication at least with the own vehicle, and capable of communicating at least one of information about driving, information about braking, information about steering, and information about rear recognition function of a preceding vehicle which is a distance between the own vehicle and the preceding vehicle through the inter-vehicle communication.

Moreover, in the present embodiment, the control unit 103 outputs the platooning request information in consideration of the relationship between the lane on which the own vehicle is traveling and the lane on which the other vehicle is traveling and/or the speed difference between the own vehicle and the other vehicle. In the relationship between the own vehicle and the other vehicle, the relationship between the lanes on which the respective vehicles travel and the speed difference between the vehicles are taken into consideration, so that the own vehicle can platoon with the other vehicle traveling at an appropriate position at an appropriate speed.

Further, in the present embodiment, the control unit 103 stops all the platooning vehicles while they keep the platoon form, and then executes a platooning stop process to request the other vehicle to free the platoon. Since the platooning vehicles stop while they keep the platoon form, the own vehicle in which the abnormality has occurred also can stop safely. Since the control unit 103 then requests the other vehicle to free the platoon, it is possible to minimize the restraint of the other vehicle.

Further, in the present embodiment, the control unit 103 executes the platooning stop process when abnormalities have occurred in a plurality of recognition functions of the own vehicle. In the case where abnormalities have occurred in a plurality of recognition functions, the risk of continuation of traveling is enhanced even if the recognition function has been assisted by the other vehicle. So, the platooning stop process is executed, thereby making it possible to stop the vehicles safely.

Furthermore, in the present embodiment, the control unit 103 executes the platooning stop process when the traveling directions of the own vehicle and the traveling directions of the other vehicle are different from each other. In the case where the traveling directions of the own vehicle and the traveling directions of the other vehicle that is platooning are different from each other, the control unit 103 executes the platooning stop process, so that the other vehicle can continue in the target traveling directions. Moreover, the control unit 103 executes the platooning stop process, and the own vehicle is released from the platoon, and thus can form a platoon with any other vehicle that is identical in the traveling directions.

Further, in the present embodiment, the control unit 103 restricts behaviors of the own vehicle in accordance with the abnormality recognition direction. The control unit 103 controls the behaviors of the own vehicle in accordance with the abnormality recognition direction, thereby enabling automatic driving using the recognition result in a direction in which no abnormality has occurred.

Furthermore, in the present embodiment, the communication switching unit 104 is intended to switch a communication means with the other vehicle, and executes a communication switching process to make direct communication with a mobile communication network using mobile communication along with the execution of the procedure modification control by the control unit 103.

An abnormality, if having occurred in the recognition function, is dealt with using communication. Communication functions include wireless LAN for use in inter-vehicle communication, but this is problematic in communication stability and wide regional adaptability. So, mobile communication can be utilized in parallel with wireless LAN to impart redundancy, so that, even if an abnormality has occurred in inter-vehicle communication, the abnormality can be dealt with through mobile communication, and the safety is further enhanced. Further, it is possible to request a distant vehicle not reachable via direct inter-vehicle communication to form a platoon.

Moreover, in the present embodiment, the communication switching unit 104 can increase communication priority of the own vehicle in the execution of the communication switching process.

The communication priority of the own vehicle is increased, thereby making it possible to perform communication even in a state where there is communication congestion affecting a portable terminal used by an occupant or the communication line is suffering interference. Thus, the abnormality in the recognition function can be assisted smoothly.

Figure 2:
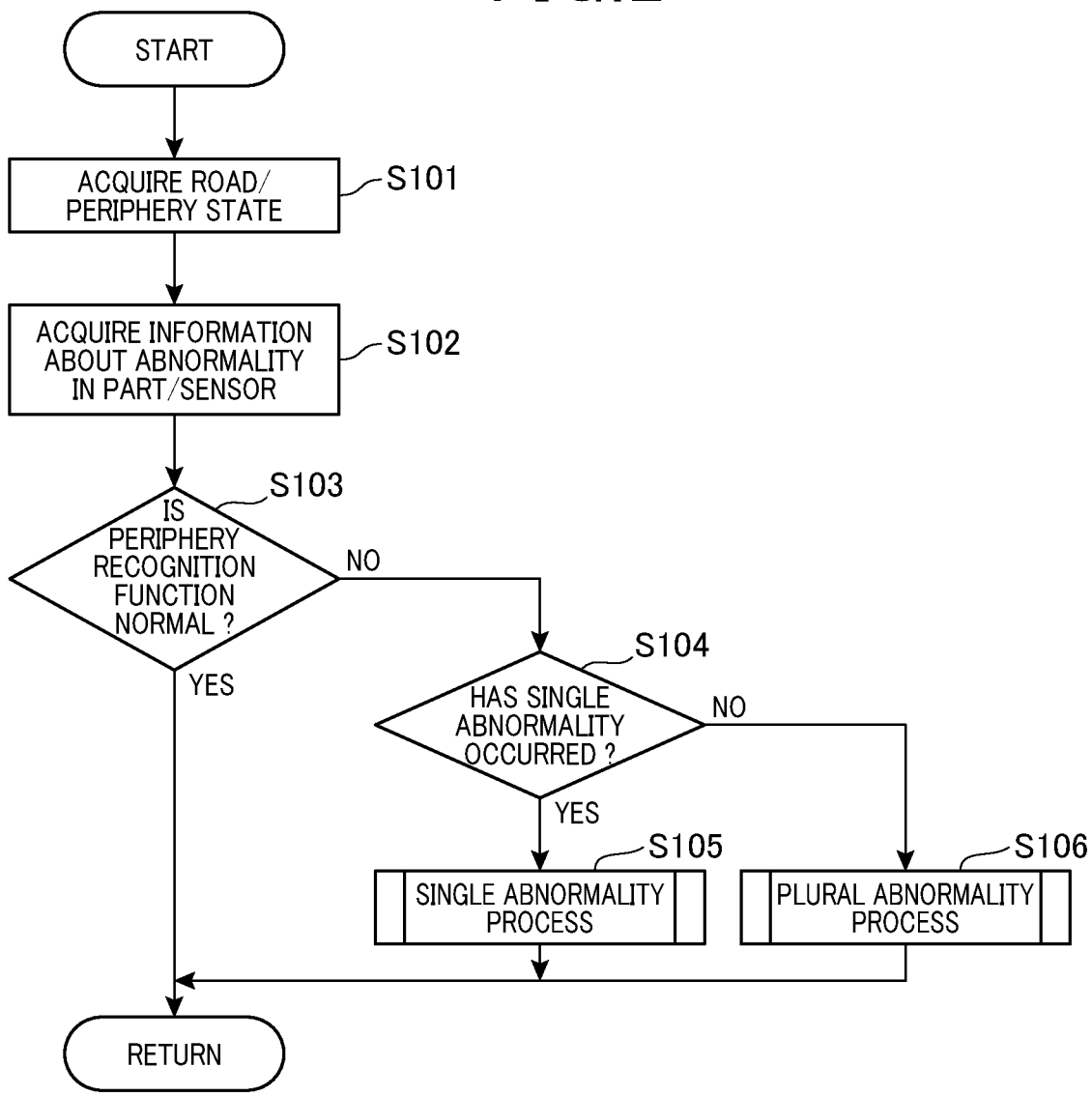
FIG. 2 is a flow chart for explaining processes of the traveling control device shown in FIG. 1.

Next, a specific control process of the traveling control device 10 will be described with reference to FIG. 2. In step S101, the peripheral recognition unit 101 acquires the state of a road and the state of the periphery. In step S102 subsequent to step S101, the abnormality determination unit 102 acquires information about an abnormality in a part/sensor.

In step S103 subsequent to step S102, the abnormality determination unit 102 determines whether the periphery recognition function is normal. In the case where the periphery recognition function is normal, the process terminates and returns. In the case where the periphery recognition function is not normal, the process proceeds to step S104.

In step S104, the abnormality determination unit 102 determines whether a single abnormality has occurred. In the case where a single abnormality has occurred, the process proceeds to step S105. In the case where a plurality of abnormalities have occurred, the process proceeds to step S106.

In step S105, a single abnormality process is executed. When the single abnormality process terminates, the process returns. In step S106, a plural abnormality process is executed. When the plural abnormality process terminates, the process returns.

Figure 3:
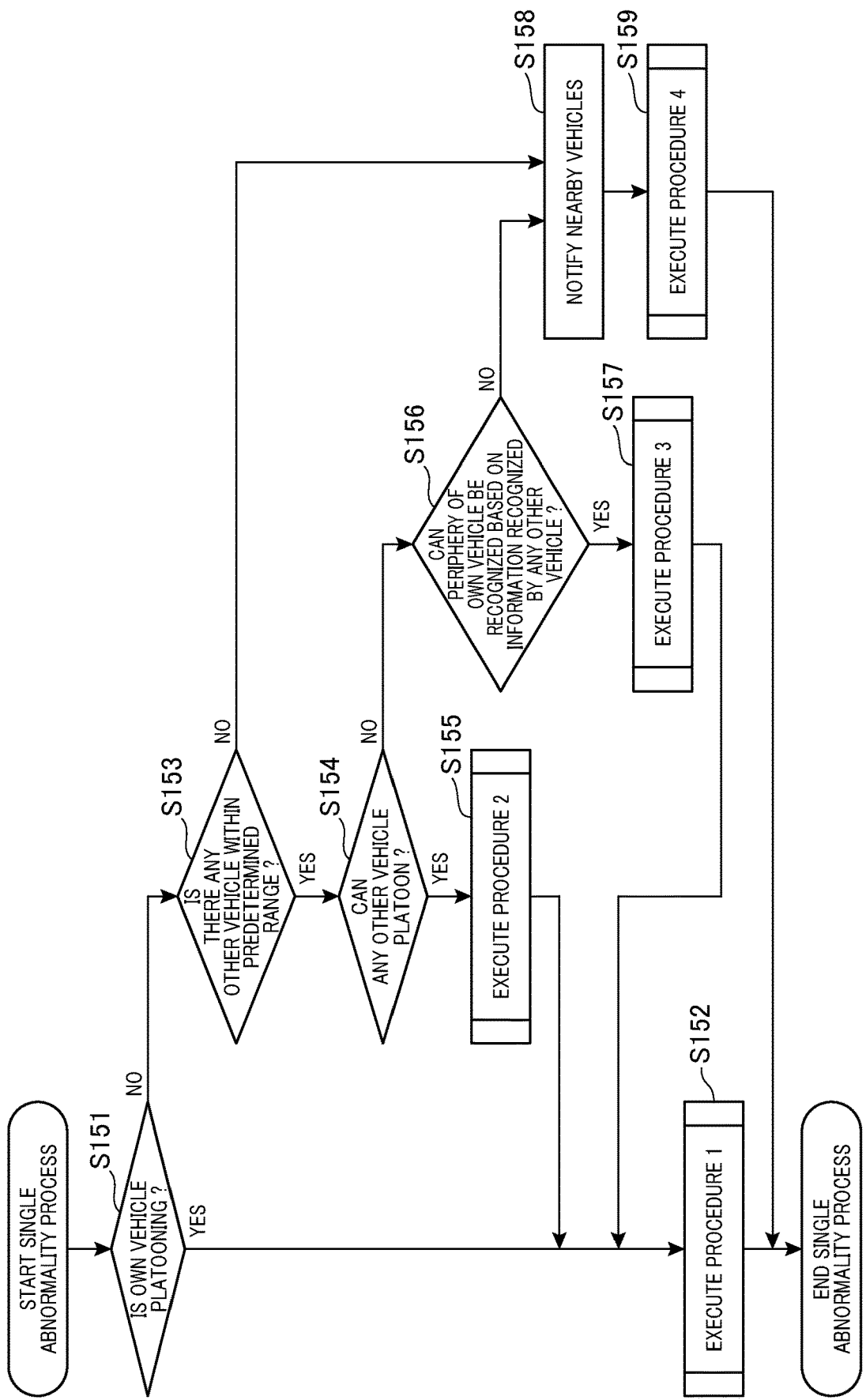
FIG. 3 is a flow chart for explaining a single abnormality process in FIG. 2.

A single abnormality process will be described with reference to FIG. 3. In step S151, the control unit 103 determines whether the own vehicle is platooning. When the own vehicle is platooning, the process proceeds to step S152. When the own vehicle is not platooning, the process proceeds to step S153.

Figure 4:
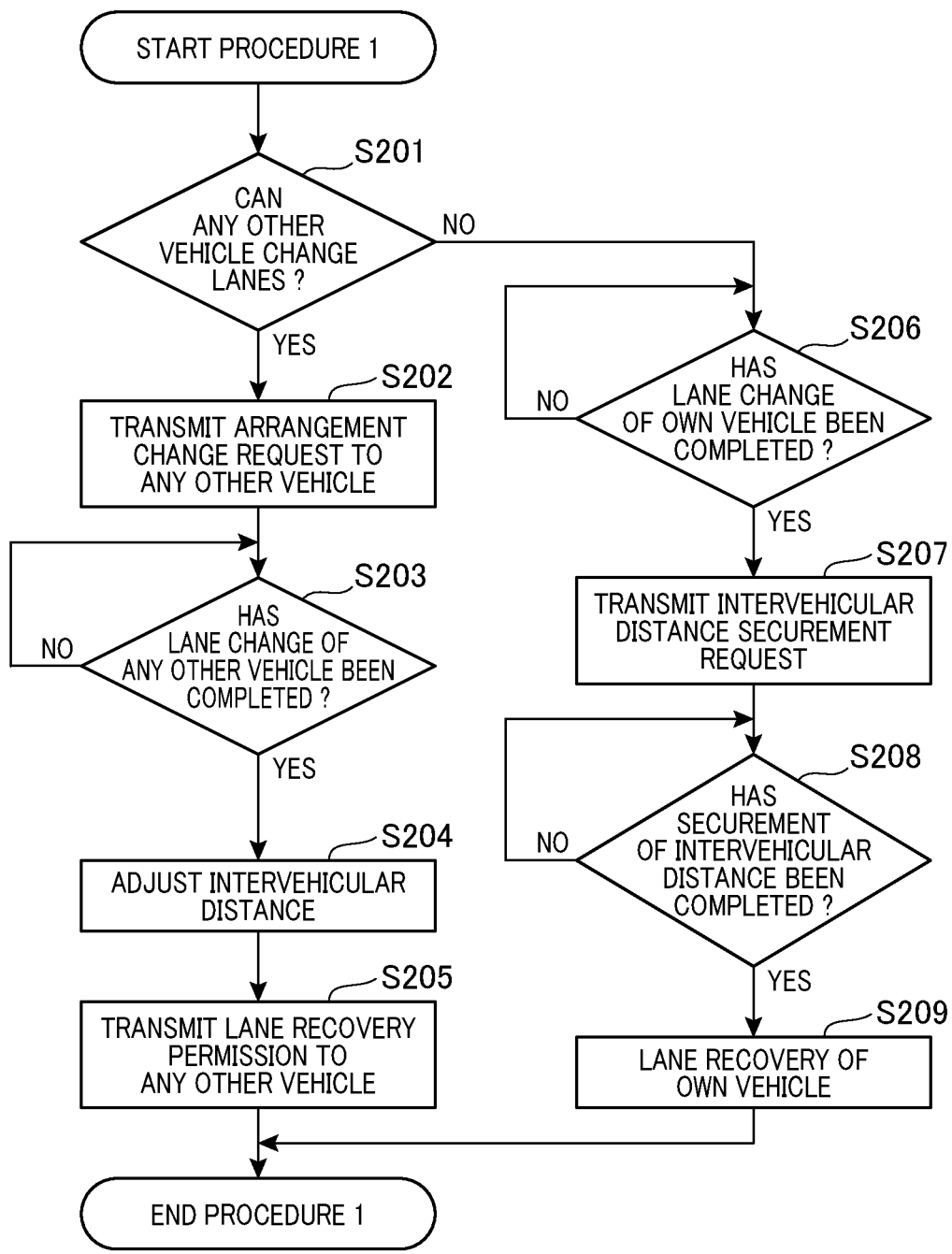
FIG. 4 is a flow chart for explaining a procedure 1 in FIG. 3.

In step S152, a procedure 1 is executed. The procedure 1 will be described with reference to FIG. 4.

In step S201, the control unit 103 determines whether any other vehicle can change lanes. Whether the other vehicle can change lanes may be determined by performing communication with the other vehicle, or may be predetermined. When the other vehicle can change lanes, the process proceeds to step S202. When the other vehicle cannot change lanes, the process proceeds to step S206.

Figure 5:
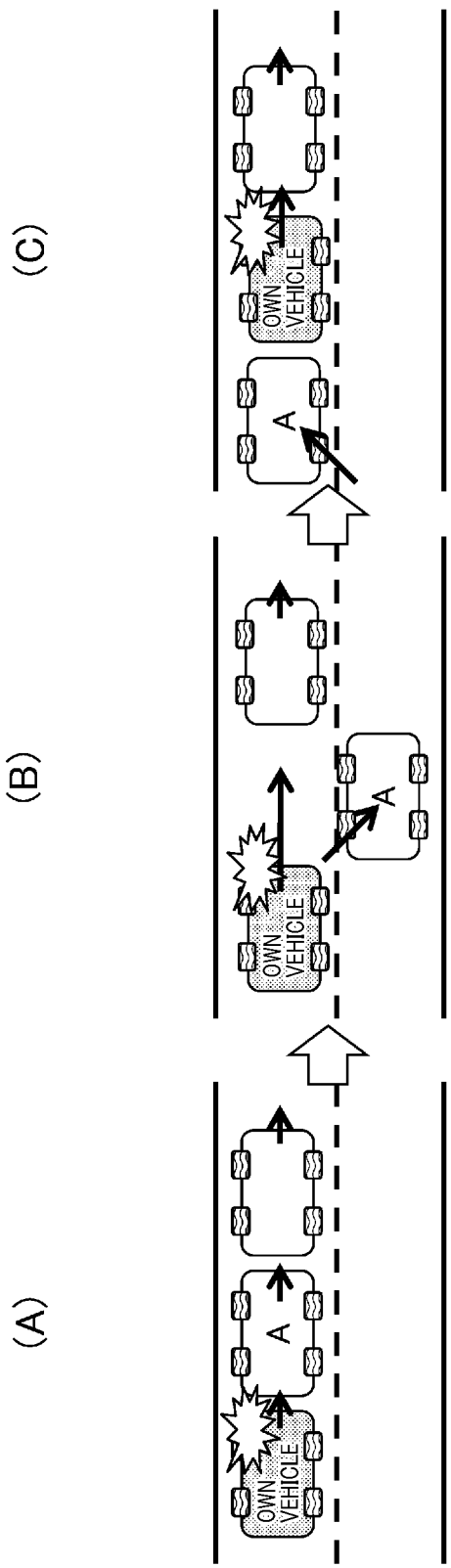
FIG. 5 is a view for explaining an example of a vehicle platoon change in FIG. 4.

In step S202, the control unit 103 transmits an arrangement change request to the other vehicle A, as shown in FIG. 5(A). The other vehicle A which has received the arrangement change request executes a lane change as shown in FIG. 5(B).

In step S203 subsequent to step S202, the control unit 103 determines whether the lane change of the other vehicle has been completed. Whether the lane change of the other vehicle has been completed may be determined by performing communication with the other vehicle, or the control unit 103 may autonomously make such determination using the recognition function of the own vehicle. When the lane change of the other vehicle has been completed, the process proceeds to step S204. When the lane change of the other vehicle has not been completed, the process in step S203 is repeated.

In step S204, the control unit 103 executes adjustment of the distance between vehicles. Specifically, as shown in FIG. 5(C), the intervehicular distance is adjusted so that the own vehicle gets closer to the preceding vehicle after the other vehicle A has avoided it.

In step S205 subsequent to step S204, the control unit 103 transmits a lane return permission to the other vehicle A. In response to the reception of this lane return permission, the other vehicle A executes control for lane return.

Figure 6:
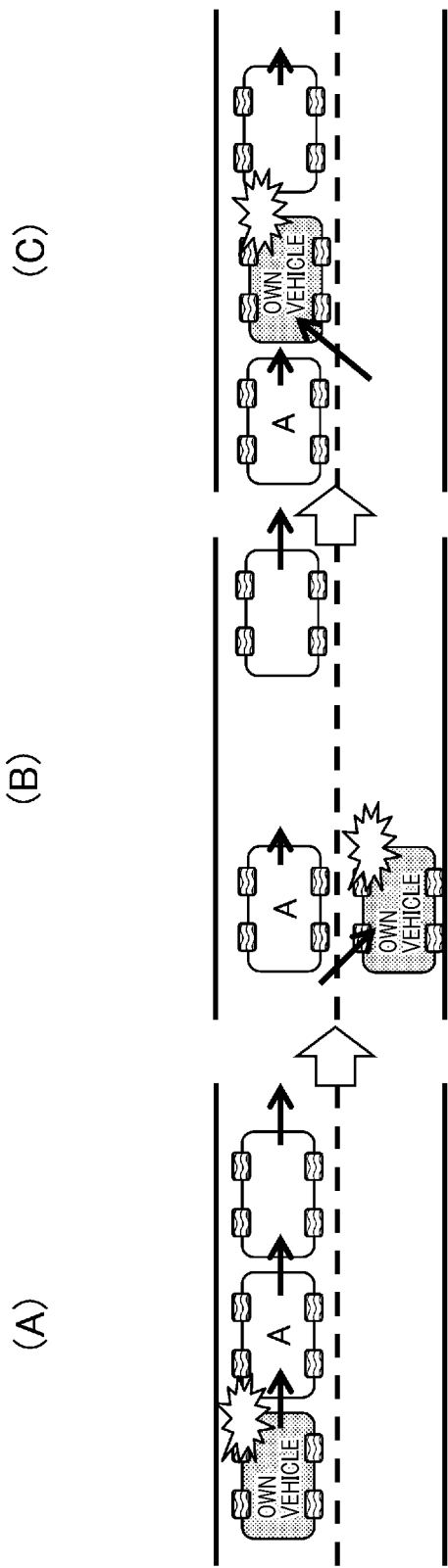
FIG. 6 is a view for explaining another example of the vehicle platoon change in FIG. 4.

In step S206, the control unit 103 determines whether the lane change of the own vehicle has been completed. When the lane change of the own vehicle has been completed as shown in FIG. 6(A), the process proceeds to step S207. When the lane change of the own vehicle has not been completed, the process in step S206 is repeated.

In step S207, the control unit 103 transmits an intervehicular distance securement request to the other vehicle A. In step S208 subsequent to step S207, the control unit 103 determines whether the securement of the intervehicular distance of the other vehicle A from the preceding vehicle has been completed. When the securement of the intervehicular distance of the other vehicle A from the preceding vehicle has been completed as shown in FIG. 6(B), the process proceeds to step S209. When the securement of the intervehicular distance of the other vehicle A from the preceding vehicle has not been completed, the process in step S208 is repeated. In step S209, the control unit 103 causes the lane return of the own vehicle as shown in FIG. 6(C).

Returning to FIG. 3, the process in step S153 will be described. In step S153, it is determined whether any other vehicle is present within a predeterminer range. The predetermined range is a range in which any other vehicle can physically form a platoon with the own vehicle, which range is set to request platooning with any other vehicle that is present within the range. When any other vehicle is present within the predetermined range, the process proceeds to step S154. When no other vehicle is present within the predetermined range, the process proceeds to step S158.

In step S154, the control unit 103 determines whether the other vehicle can platoon. Whether the other vehicle can platoon is determined by performing communication with the other vehicle. When the other vehicle can platoon, the process proceeds to step S155. When the other vehicle cannot platoon, the process proceeds to step S156.

Figure 7:
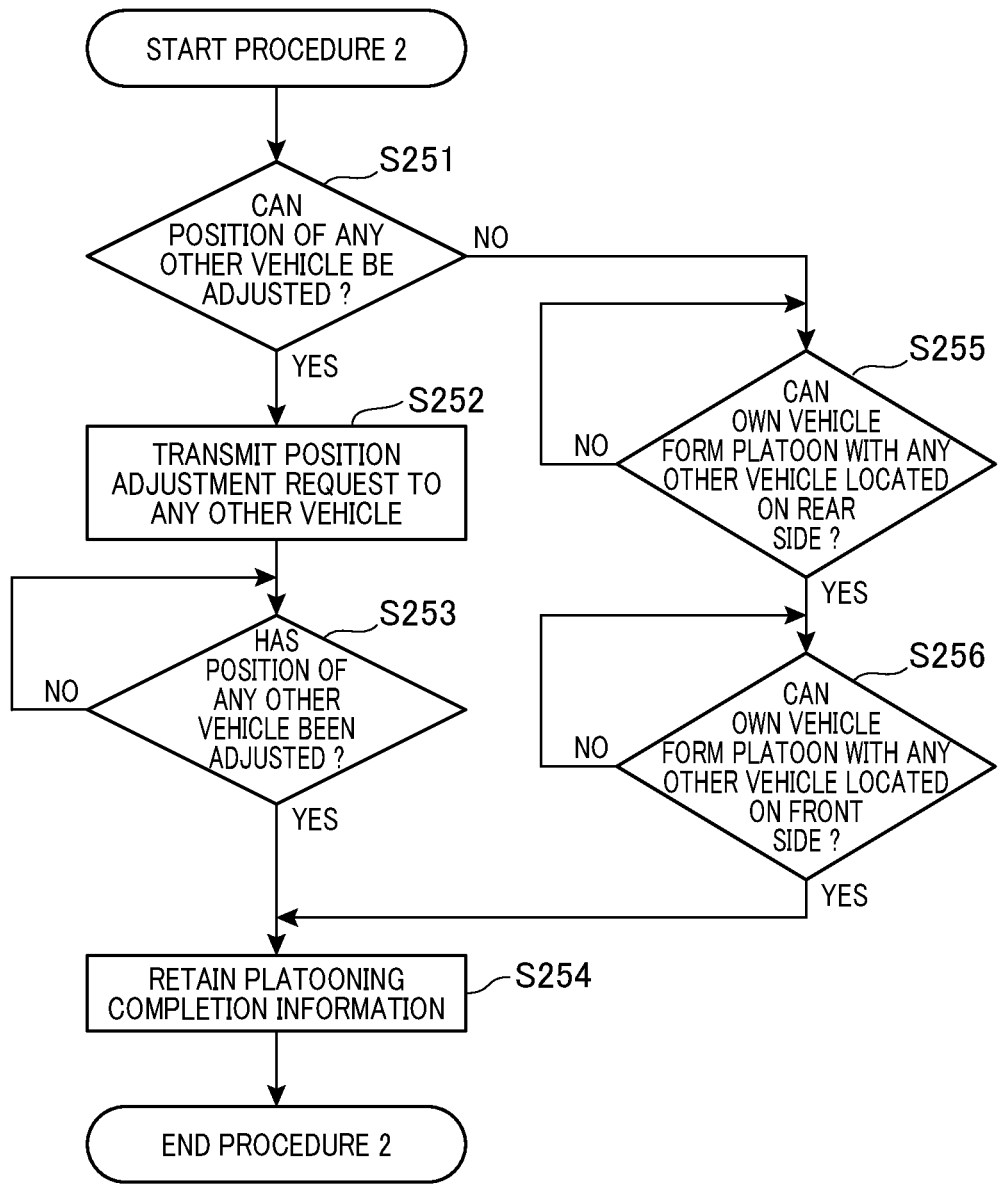
FIG. 7 is a flow chart for explaining a procedure 2 in FIG. 3.

In step S155, a procedure 2 is executed. When the execution of the procedure 2 has been completed, the process proceeds to step S152. The procedure 2 will be described with reference to FIG. 7.

In step S251, the control unit 103 determines whether the other vehicle can adjust its own position. Whether the other vehicle can adjust its own position may be determined by performing communication with the other vehicle, or may be predetermined. When the other vehicle can adjust its own position, the process proceeds to step S252. When the other vehicle cannot adjust its own position, the process proceeds to step S255.

Figure 8:
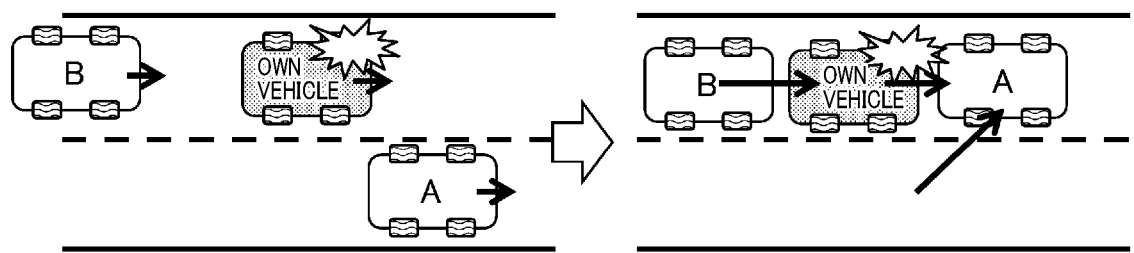
FIG. 8 is a view for explaining an example of a vehicle platoon change in FIG. 7.

In step S252, the control unit 103 transmits a position adjustment request to the other vehicle. In the example shown in FIG. 8, the control unit 103 transmits, to the other vehicle A, a position adjustment request to adjust its position to the left front side of the other vehicle A, in FIG. 8(A). It transmits, to the other vehicle B, a position adjustment request to adjust its position to the front side of the other vehicle B. When the position adjustment has been completed as a result of the transmission of the position adjustment requests, the vehicles are brought into a state as shown in FIG. 8(B).

In step S253 subsequent to step S252, the control unit 103 determines whether the positions of the other vehicles have been adjusted. Whether the positions of the other vehicles have been adjusted may be determined by performing communication with the other vehicles, or may be autonomously determined by the control unit 103 using the recognition function of the own vehicle. When the positions of the other vehicles have been adjusted, the process proceeds to step S254. When the positions of the other vehicles have not been adjusted, the process in step S253 is repeated. In step S254, platooning completion information is retained.

In step S255, the control unit 103 determines whether the own vehicle has been able to form a platoon with any other vehicle located on the rear side. In the example shown in FIG. 9, the own vehicle has been able to form a platoon with the other vehicle B located on the rear side in FIG. 9(A) to FIG. 9(B). When the own vehicle has been able to form a platoon with any other vehicle located on the rear side, the process proceeds to step S256. When the own vehicle has not been able to form a platoon with any other vehicle located on the rear side, the process in step S255 is repeated.

Figure 9:
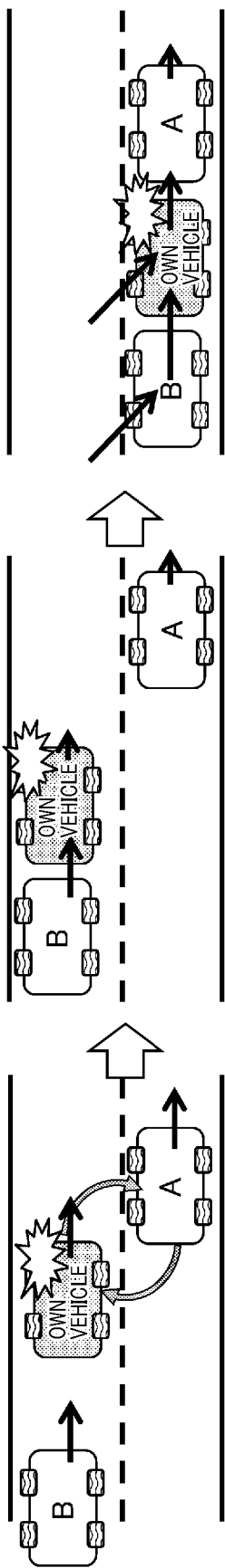
FIG. 9 is a view for explaining another example of the vehicle platoon change in FIG. 7.

In step S256, the control unit 103 determines whether the own vehicle has been able to form a platoon with any other vehicle located on the front side. In the example shown in FIG. 9, the own vehicle adjusts its own position in a state where it forms a platoon with the other vehicle B, so that the own vehicle has been able to form the platoon with the other vehicle A located on the front side as shown in FIG. 9(C). When the own vehicle has been able to form the platoon with the other vehicle located on the front side, the process proceeds to step S254. When the own vehicle has not been able to form the platoon with the other vehicle located on the front side, the process in step S256 is repeated.

Returning to FIG. 3, the process in step S156 will be described. In step S156, it is determined whether the periphery of the own vehicle can be recognized based on the information about the periphery recognized by any other vehicle. When the periphery of the own vehicle can be recognized based on the information about the periphery recognized by the other vehicle, the process proceeds to step S157. When the periphery of the own vehicle cannot be recognized based on the information about the periphery recognized by the other vehicle, the process proceeds to step S158.

Figure 10:
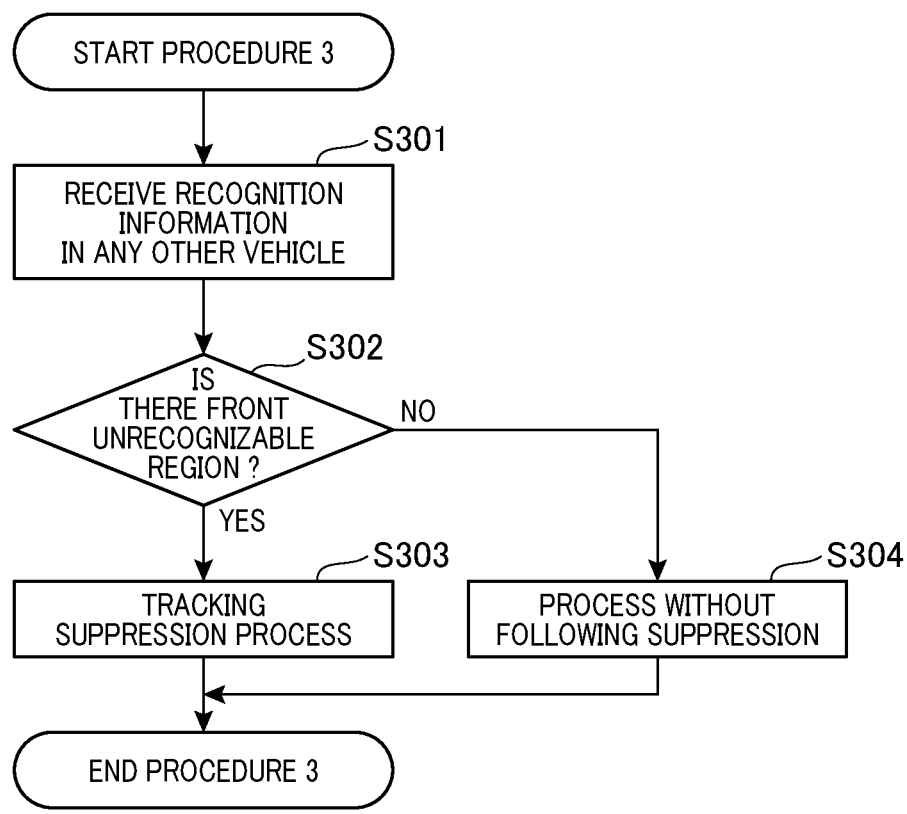
FIG. 10 is a flow chart for explaining a procedure 3 in FIG. 3.

In step S157, a procedure 3 is executed. When the execution of the procedure 3 has been completed, the process proceeds to step S152. The procedure 3 will be described with reference to FIG. 10.

Figure 11:
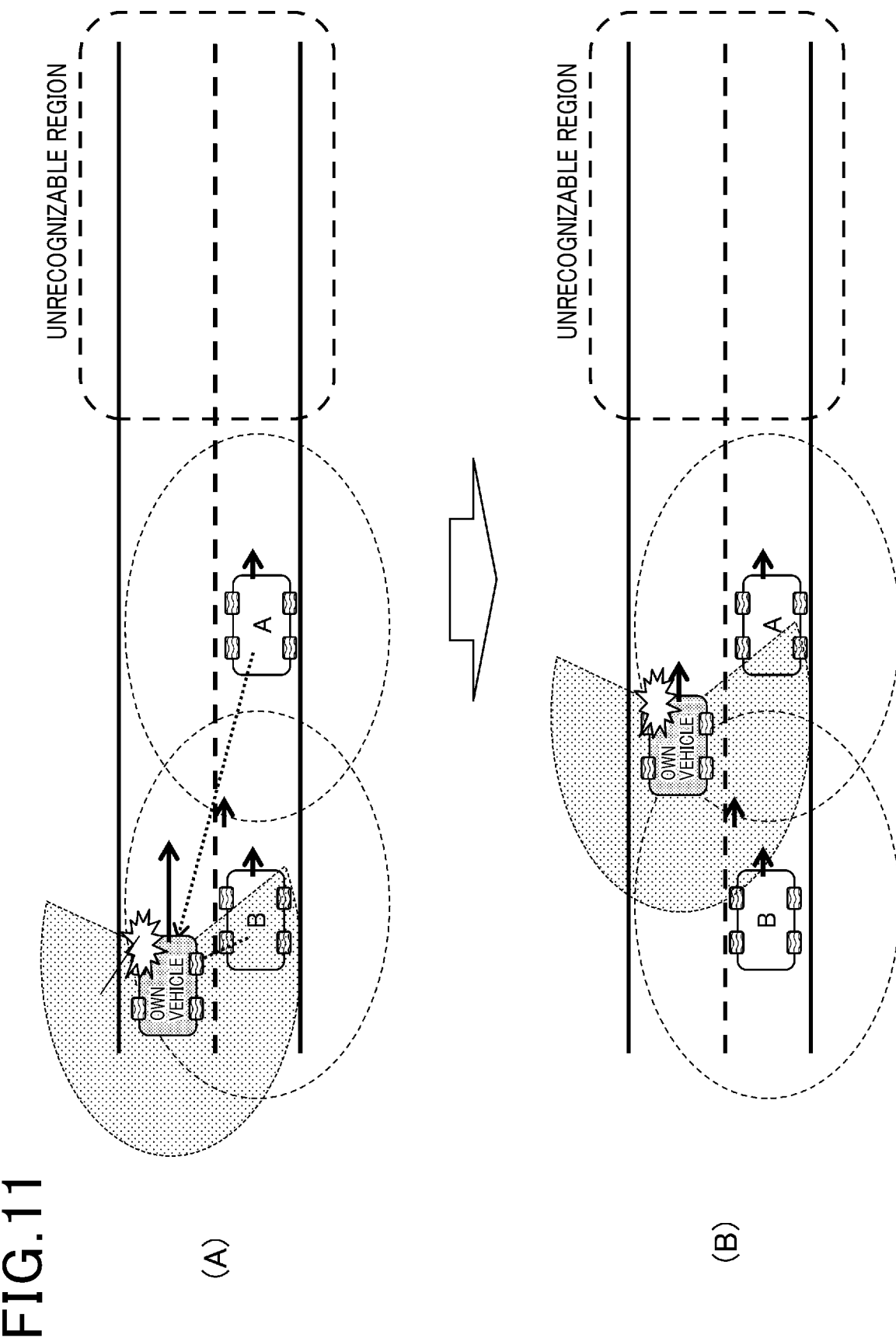
FIG. 11 is a view for supplementing the explanation of the flow chart in FIG. 10.

In step S301, the control unit 103 receives, from the other vehicle, recognition information in the other vehicle. In step S302 subsequent to step S301, the control unit 103 determines whether there is a front unrecognizable region. The example shown in FIG. 11 illustrates an example in which there is a front unrecognizable region since no other vehicle is present on the front side of the other vehicle A. The own vehicle receives recognition information from the other vehicle B in FIG. 11(A), and therefore the control unit 103 determines that there is no front unrecognizable region since the other vehicle A is present in front of the other vehicle B. The own vehicle then receives recognition information from the other vehicle A in FIG. 11(B). As a result, the control unit 103 determines that there is a front unrecognizable region since no other vehicle is present on the front side of the other vehicle A. When the control unit 103 determines that there is a front unrecognizable region, the process proceeds to step S303. When the control unit 103 determines that there is no front unrecognizable region, the process proceeds to step S304.

In step S303, the control unit 103 executes a following suppression process. In the example shown in FIG. 11(B), the following suppression process is to control the vehicle speed or the traveling lane so that the own vehicle does not depart from a range in which recognition information can be received from the other vehicle A. In step S304, the control unit 103 executes the process without following suppression.

Returning to FIG. 3, the process in step S158 will be described. In step S158, the control unit 103 notifies to nearby vehicles. As one example, the control unit 103 causes the external display device 41 to display that the own vehicle is under automatic driving and an abnormality has occurred in the periphery recognition function.

Figure 12:
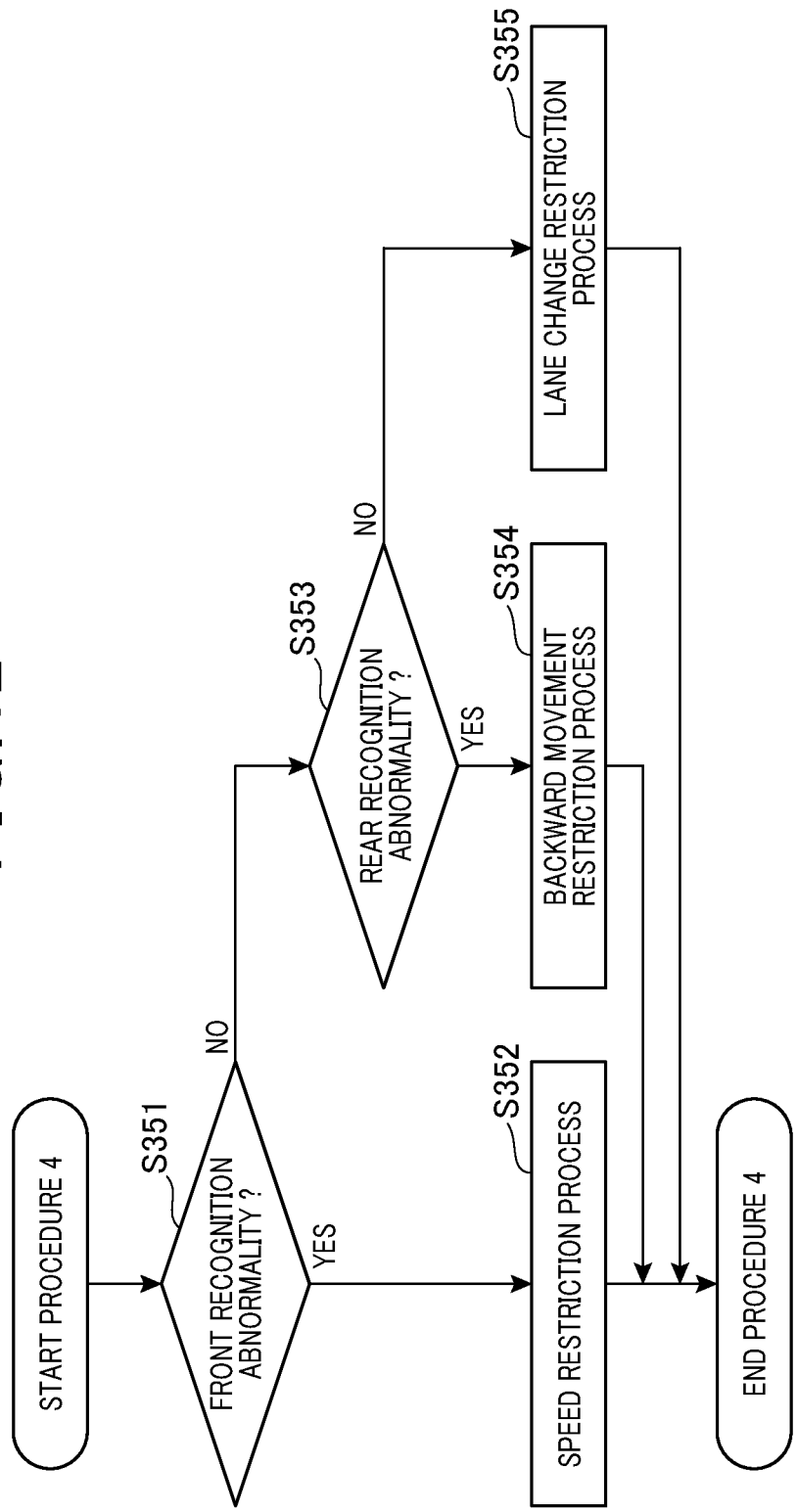
FIG. 12 is a flow chart for explaining a procedure 4 in FIG. 3.

In step S159 subsequent to step S158, a procedure 4 is executed. The procedure 4 is to permit operation in a direction in which no abnormality has occurred while restricting operation in the direction in which the abnormality has occurred. When the execution of the procedure 4 has been completed, the process terminates. The procedure 4 will be described with reference to FIG. 12.

In step S351, the abnormality determination unit 102 determines whether a front recognition abnormality has occurred. When a front recognition abnormality has occurred, the process proceeds to step S352. When no front recognition abnormality has occurred, the process proceeds to step S353.

In step S352, the control unit 103 executes a speed restriction process. In the case where a front recognition abnormality has occurred, which is a recognition abnormality caused by the camera, the wiper 36 may be actuated to remove dirt. In step S353, the abnormality determination unit 102 determines whether a rear recognition abnormality has occurred. When a rear recognition abnormality has occurred, the process proceeds to step S354. When no rear recognition abnormality has occurred, the process proceeds to step S355.

In step S354, the control unit 103 executes a backward movement restriction process. In step S354, a lane change restriction process may be performed. In step S355, the control unit 103 executes the lane change restriction process.

Figure 13:
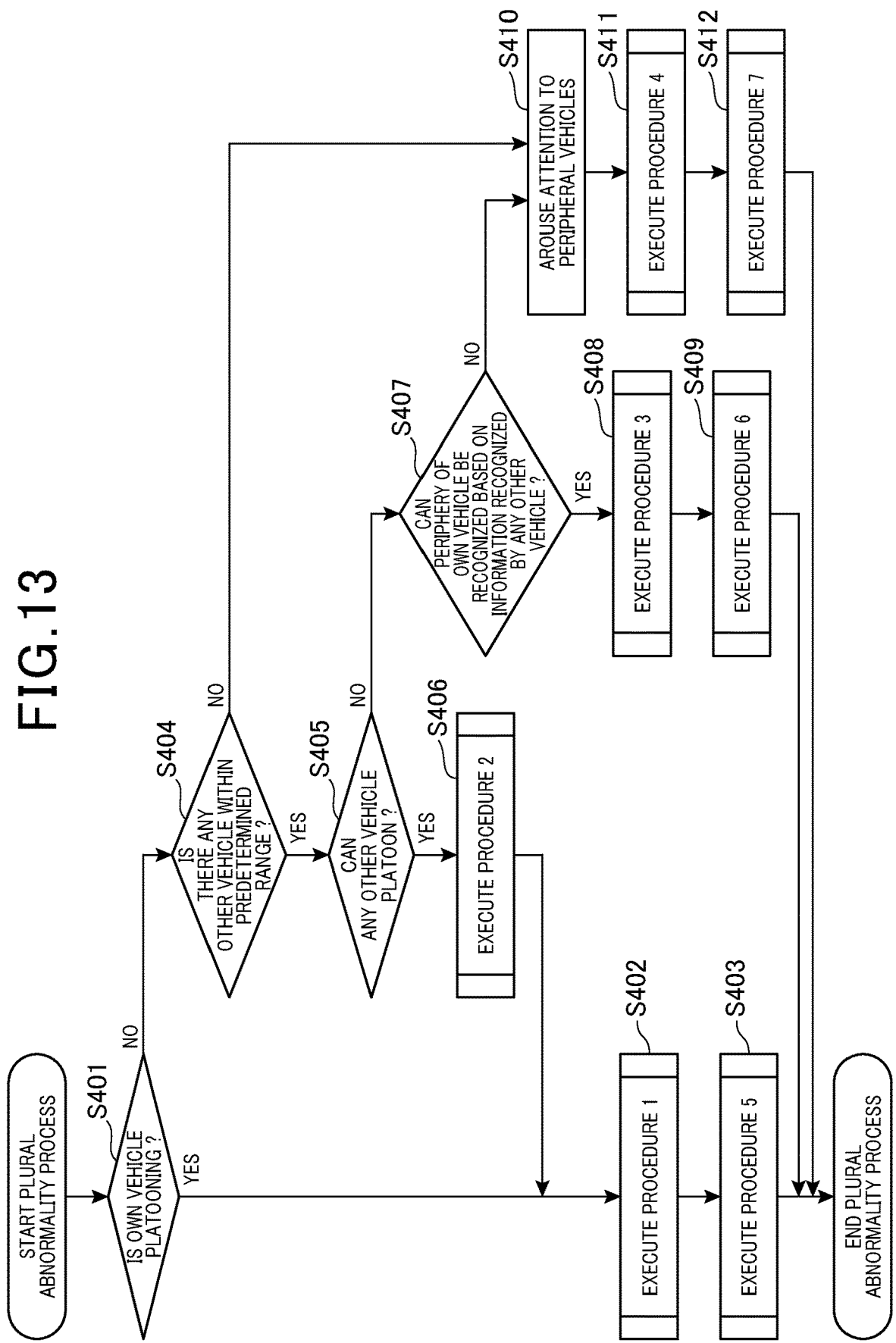
FIG. 13 is a flow chart for explaining a plural abnormality process in FIG. 1.

The plural abnormality process in step S106 in FIG. 2 will be described with reference to FIG. 13. In step S401, the control unit 103 determines whether the own vehicle is platooning. When the own vehicle is platooning, the process proceeds to step S402. When the own vehicle is not platooning, the process proceeds to step S404.

In step S402, a procedure 1 is executed. Since the procedure 1 has been described with reference to FIG. 4, the description thereof is omitted.

Figure 14:
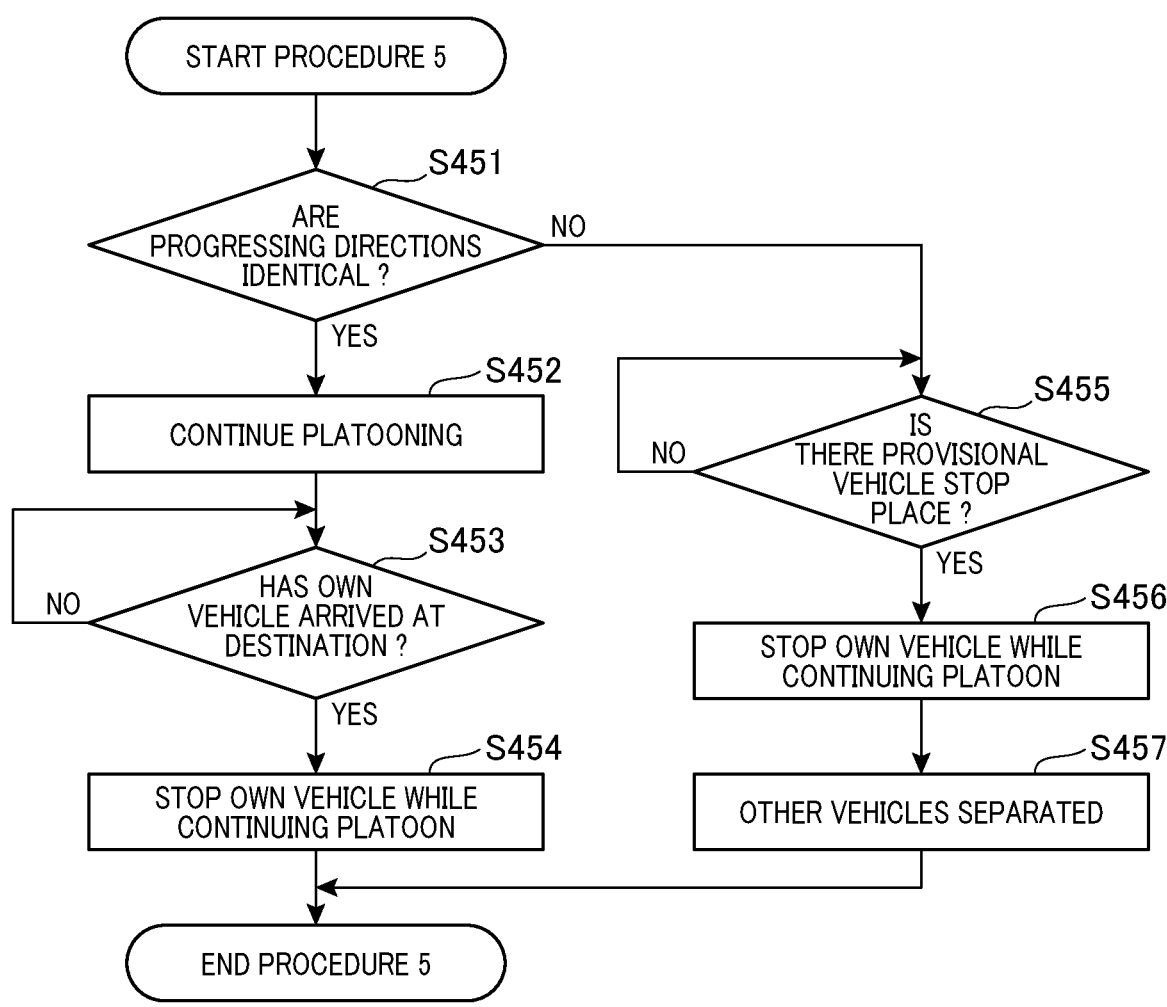
FIG. 14 is a flow chart for explaining a procedure 5 in FIG. 13.

In step S403 subsequent to step S402, a procedure 5 is executed. The procedure 5 will be described with reference to FIG. 14.

In step S451, the control unit 103 determines whether the traveling directions of the own vehicle and the traveling directions of any other vehicle forming a platoon are identical with each other. When the traveling directions are identical, the process proceeds to step S452. When the traveling directions are not identical, the process proceeds to step S455. As shown in FIG. 15(A), the own vehicle desires to move leftward, whereas the other vehicles A and B desire to move in forward. So, in this case, the control unit 103 determines that the traveling directions are not identical.

In step S452, the control unit 103 continues platooning. In step S453 subsequent to step S452, the control unit 103 determines whether the own vehicle has arrived at a destination. When the own vehicle has arrived at a destination, the process proceeds to step S454. When the own vehicle has not arrived at a destination, the process in step S453 is repeated.

In step S454, the control unit 103 stops the own vehicle while continuing the platoon. The control unit 103 requests the other vehicles to stop synchronously. When the process in step S454 terminates, the process returns to the process in FIG. 13.

In step S455, the control unit 103 determines whether there is a provisional vehicle stop place. The provisional vehicle stop place is a place where the vehicles stop while continuing platooning and vehicles having different desired traveling directions can be separated. When there is a provisional vehicle stop place, the process proceeds to step S456. When there is no provisional vehicle stop place, the process in step S455 is repeated to search for the provisional vehicle stop place.

In step S456, the control unit 103 stops the own vehicle while continuing the platoon. The control unit 103 requests the other vehicles to stop synchronously. As shown in FIG. 15(B), the own vehicle and the other vehicles A, B stop in a state where they continue the platoon.

In step S457 subsequent to step S456, the other vehicles are separated. As shown in FIG. 15(C), the separated other vehicles may travel while forming a platoon. When the process in step S457 terminates, the process returns to the process in FIG. 13.

In the case where the own vehicle does not have a complete recognition abnormality, but has such a partial abnormality that recognition can be made within a range up to a predetermined distance, the own vehicle can automatically travel alone at a speed in accordance with the predetermined distance. In that case, the platooning in step S456 may not be completely stopped. When the speed of the own vehicle becomes the speed at which the vehicle can automatically drive during the deceleration due to the stop, the process proceeds to the next step S457, and the other vehicle may leave.

Returning to FIG. 13, the process in step S404 will be described. In step S404, it is determined whether any other vehicle is present within a predeterminer range. The predetermined range is a range in which any other vehicle can physically form a platoon with the own vehicle, within which range the own vehicle may suggest platooning to any other vehicle that is present within the range. When any other vehicle is present within the predetermined range, the process proceeds to step S405. When no other vehicle is present within the predetermined range, the process proceeds to step S410.

In step S405, the control unit 103 determines whether the other vehicle can platoon. Whether the other vehicle can platoon is determined by performing communication with the other vehicle. When the other vehicle can platoon, the process proceeds to step S406. When the other vehicle cannot platoon, the process proceeds to step S407.

In step S406, a procedure 2 is executed. When the execution of the procedure 2 has been completed, the process proceeds to step S152. Since the procedure 2 has been described with reference to FIG. 7, the description thereof is omitted.

In step S407, it is determined whether the periphery of the own vehicle can be recognized based on the information about the periphery recognized by the other vehicle. When the periphery of the own vehicle can be recognized based on the information about the periphery recognized by the other vehicle, the process proceeds to step S408. When the periphery of the own vehicle cannot be recognized based on the information about the periphery recognized by the other vehicle, the process proceeds to step S410.

In step S408, a procedure 3 is executed. When the execution of the procedure 3 has been completed, the process proceeds to step S409. Since the procedure 3 has been described with reference to FIG. 10, the description thereof is omitted.

Figure 16:
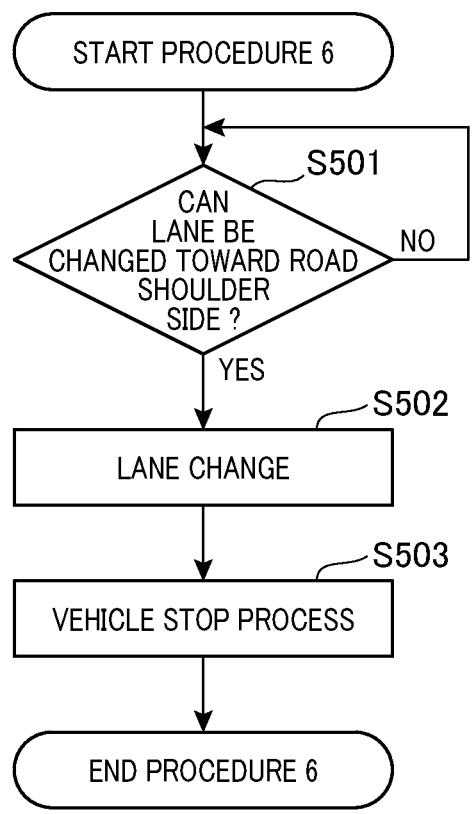
FIG. 16 is a flow chart for explaining a procedure 6 in FIG. 13.

In step S409, a procedure 6 is executed. When the execution of the procedure 6 has been completed, the plural abnormality process terminates. The procedure 6 will be described with reference to FIG. 16.

In step S501, the control unit 103 determines whether the lane can be changed toward the road shoulder side. When the lane can be changed toward the road shoulder side, the process proceeds to step S502. When the lane cannot be changed toward the road shoulder side, the process in step S501 is repeated.

In step S502, the control unit 103 executes the lane change toward the road shoulder side. In step S503 subsequent to step S502, the control unit 103 executes a vehicle stop process, and the procedure 6 terminates.

Returning to FIG. 13, the process in step S410 will be described. In step S410, the control unit 103 notifies to nearby vehicles. As one example, the control unit 103 causes the external display device 41 to display that the own vehicle is under automatic driving and an abnormality in the periphery recognition function has occurred.

In step S411 subsequent to step S410, a procedure 4 is executed. When the execution of the procedure 4 has been completed, the process proceeds to step S412. Since the procedure 4 has been described with reference to FIG. 12, the description thereof is omitted.

Figure 17:
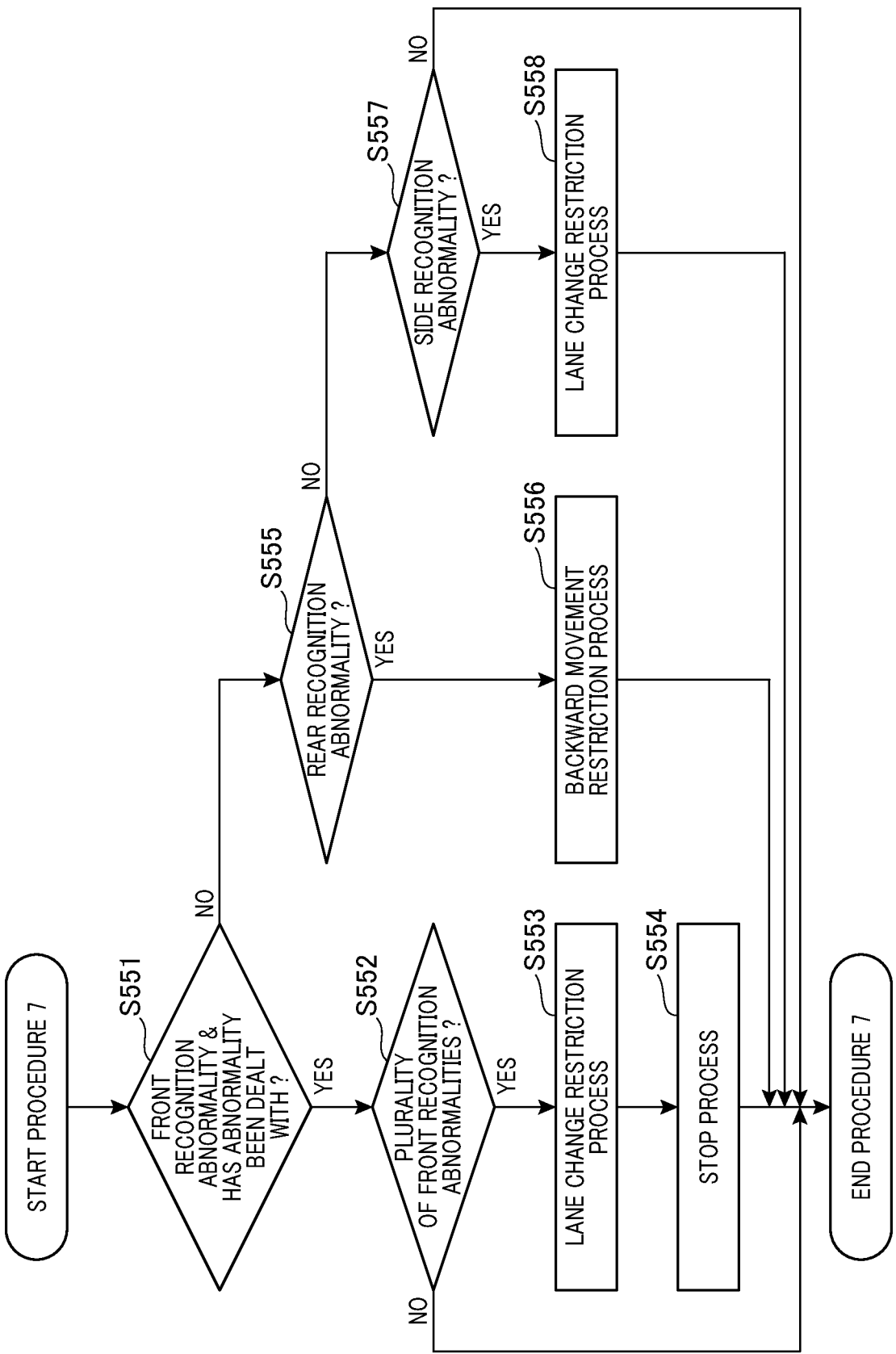
FIG. 17 is a flow chart for explaining a procedure 7 in FIG. 13.

In step S412, a procedure 7 is executed. When the execution of the procedure 7 has been completed, the plural abnormality process terminates. The procedure 7 will be described with reference to FIG. 17. The procedure 7 is to take measures when any other abnormality has occurred in addition to the abnormality occurrence place dealt with by corresponding to the procedure 4.

In step S551, the abnormality determination unit 102 determines whether a front recognition abnormality has occurred or not, or whether such an abnormality, when having occurred, has been dealt with. When a front recognition abnormality has occurred, the process proceeds to step S552. When a front recognition abnormality has not occurred, or such an abnormality, even though having occurred, has been dealt with, the process proceeds to step S555.

In step S552, the abnormality determination unit 102 determines whether a plurality of front recognition abnormalities have occurred. When a plurality of front recognition abnormalities have occurred, the process proceeds to step S553. When a plurality of front recognition abnormalities have not occurred, the process in the procedure 7 terminates.

In step S553, the control unit 103 executes the lane change restriction process. In step S554 subsequent to step S553, the control unit 103 executes a stop process, and the process in the procedure 7 terminates.

In step S555, the abnormality determination unit 102 determines whether there are any remaining rear recognition abnormalities. When a rear recognition abnormality has occurred, the process proceeds to step S556. When a rear recognition abnormality has not occurred, or such a rear recognition abnormality, even though having occurred, has been dealt with, the process proceeds to step S557.

In step S556, the control unit 103 executes a backward movement restriction process, and the process in the procedure 7 terminates.

In step S557, the control unit 103 determines whether a side recognition abnormality has occurred or not, or whether a side recognition abnormality, when having occurred, has been dealt with. When a side recognition abnormality has occurred, the process proceeds to step S558. When a side recognition abnormality has not occurred, or a side recognition abnormality, even though having occurred, has been dealt with, the process in the procedure 7 terminates.

In step S558, the control unit 103 executes a lane change restriction process, and the process in the procedure 7 terminates.

Figure 18:
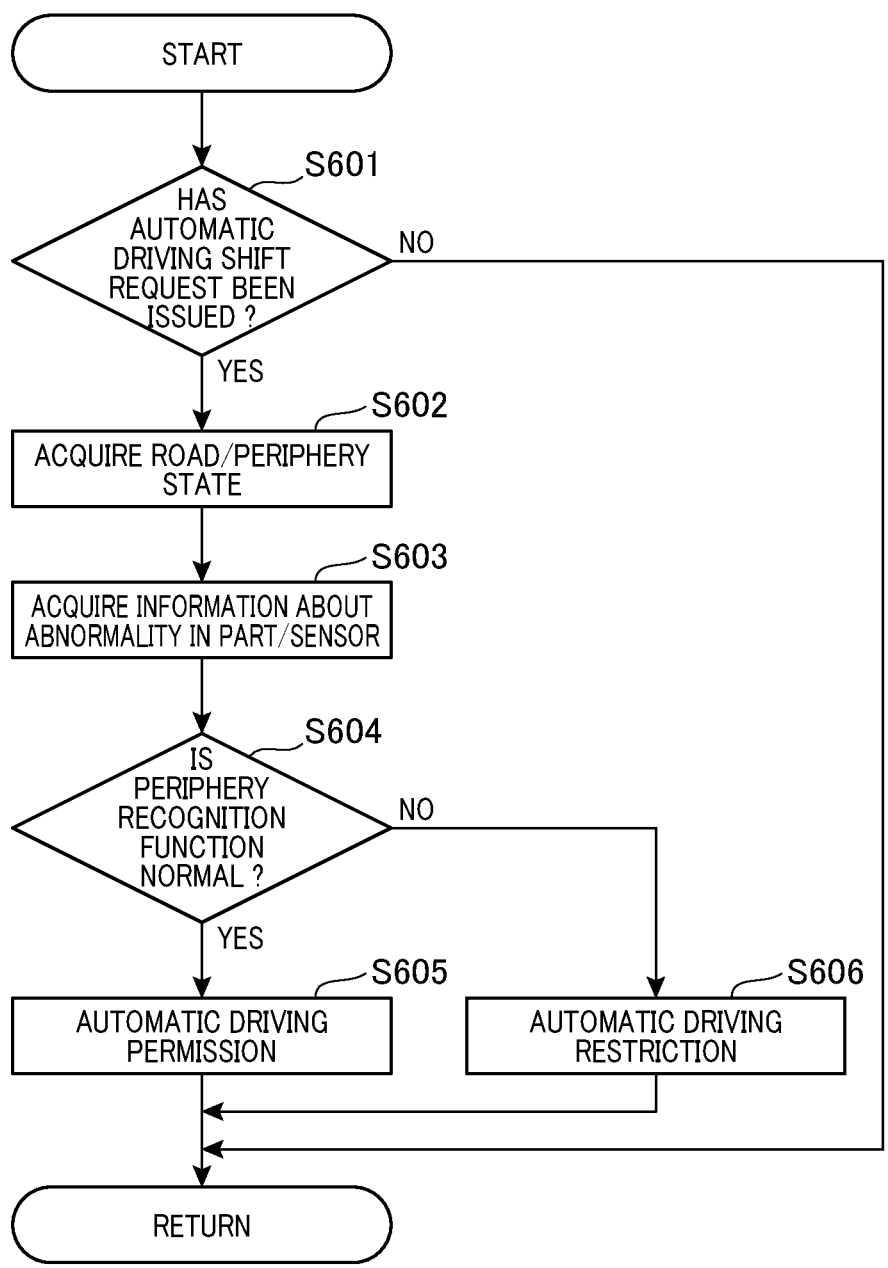
FIG. 18 is a flow chart for explaining the processes of the traveling control device shown in FIG. 1.

Next, the control process of the traveling control device 10 in the case where an automatic driving shift request has been input will be described with reference to FIG. 18. In step S601, the control unit 103 determines whether an automatic driving shift request has been issued. When an automatic driving shift request has been issued, the process proceeds to step S602. When no automatic driving shift request has been issued, the process returns.

In step S602, the peripheral recognition unit 101 acquires the state of a road and the state of the periphery. In step S603 subsequent to step S602, the abnormality determination unit 102 acquires information about an abnormality in part/sensor.

In step S604 subsequent to step S603, the abnormality determination unit 102 determines whether the periphery recognition function is functioning normally. When the periphery recognition function is normal, the process proceeds to step S605. In the case where the periphery recognition function is not functioning normally, the process proceeds to step S606.

In step S605, the control unit 103 executes an automatic driving permission process, and the process returns. In step S606, the control unit 103 executes the automatic driving restriction process, and the process returns.

Figure 19:
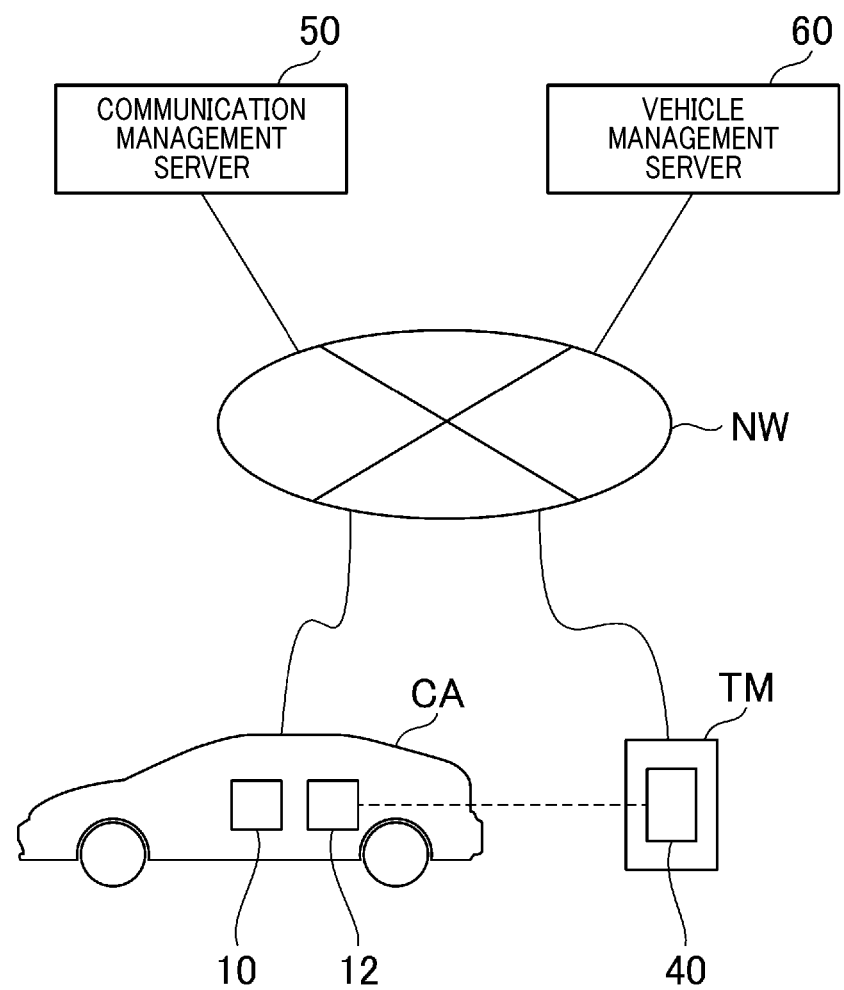
FIG. 19 is a communication network configuration diagram for explaining the outline of communication switching.

Next, the outline of communication switching will be described with reference to FIG. 19. As shown in FIG. 19, a communication management server 50 and a vehicle management server 60 are connected to a mobile communication network NW.

The communication management server 50 is a server for managing information including individual mobile body (portable terminal) identification number (telephone number) and authentication information. The vehicle management server 60 is a server for managing the correlation between a communication device provided in a vehicle and a user of the vehicle.

In the example shown in FIG. 19, an own vehicle CA is provided with the traveling control device 10 including the communication switching unit 104 and a communication means 12. A portable terminal TM is a portable terminal retained by a user of the own vehicle CA. The portable terminal TM is provided with a communication means 40.

The communication means 12, 40 retain information for identifying subscribers to the mobile communication network NW (as examples, subscription right information and an inherent ID assigned to the communication device), and enable communications using the mobile communication network NW based on this retained information. The information for identifying subscribers may be recorded in a SIM card, and, in that case, authentication is performed based on the information recorded in the SIM card. The aspect which retains the information for identifying subscribers is not limited to the SIM card, and there can be adopted an aspect such as a virtual SIM or e-SIM obtained by storing a SIM card into software retained in a storage region, wherein the information for identifying subscribers is and written or erased through communication. Hereinafter, the aspects which retain the information for identifying subscribers, including SIM card, virtual SIM and e-SIM, will be referred to as a SIM and described accordingly.

Figure 21:
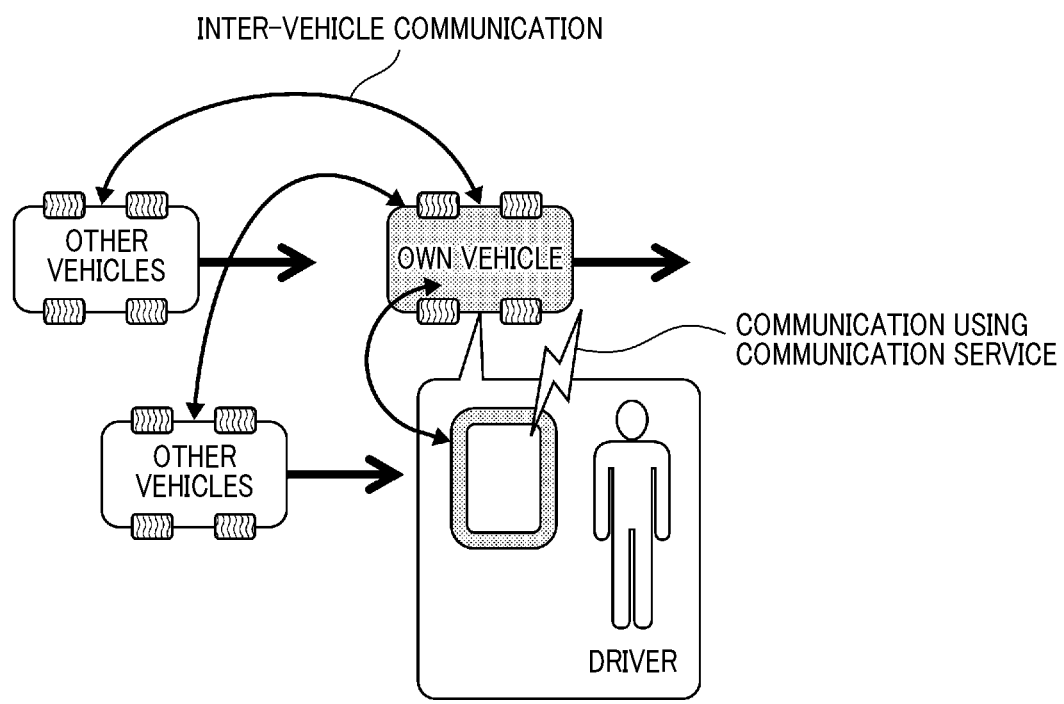
FIG. 21 is a conceptual view for explaining the outline of communication switching.

As shown in FIG. 21, in a normal state, only the communication means 40 of the portable terminal TM is activated, and the portable terminal TM directly communicates with the mobile communication network. The own vehicle CA uses the communication means 12, but is configured to be able to indirectly communicate with the mobile communication network using, for example, the tethering function of the communication means 40 of the portable terminal TM. Further, the own vehicle CA communicates with neighboring other vehicles using inter-vehicle communication.

Figure 20:
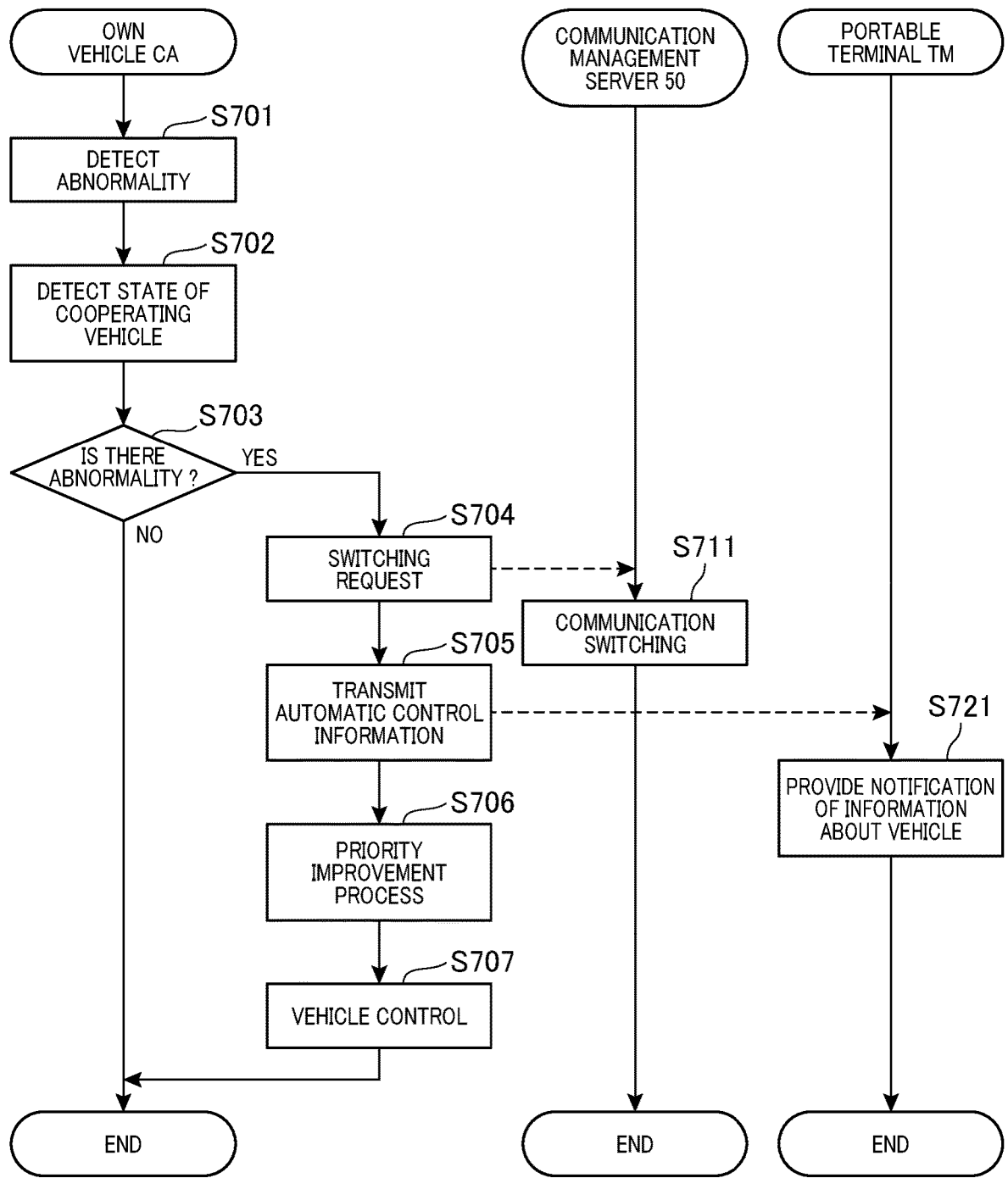
FIG. 20 is a sequence view for explaining the outline of communication switching.

Then, switching of the communication means will be described with reference to FIG. 20. In step S701, the abnormality determination unit 102 detects an abnormality in recognition function. In step S702 subsequent to step S701, the state of cooperating vehicles is detected. In step S703 subsequent to step S702, it is determined whether an abnormality has occurred in recognition function.

When an abnormality in recognition function has occurred, the process proceeds to step S704. When no abnormality in recognition function has occurred, the process terminates.

In step S704, a request to switch the communication means is issued to the communication management server 50. In response to this switching request, the communication management server 50 executes communication switching in step S711. The switching of the communication means is executed by activating the SIM switched by various methods. As one example, in FIG. 20, the vehicle management server manages information of an equipment associated with the portable terminal TM. The information of the portable terminal TM associated with the own vehicle CA is acquired from the vehicle management server 60. The SIM possessed by the communication means 40 provided in the portable terminal TM is temporarily stopped, and the SIM possessed by the communication means 12 provided in the own vehicle CA is activated. As the activation method, various methods are used, including a method in which the information to be written in the SIM is acquired through communication and written, and a method in which the information to be written in a different SIM identical with or different from that in the portable terminal is preliminarily possessed by the communication means 12, and authentication is performed with the SIM in which the information has been preliminarily recorded by controlling ON/OFF switching of mobile communication, so that activation is realized.

In step S705 subsequent to step S704, own vehicle control information is transmitted to the portable terminal TM. When receiving this transmission, the portable terminal TM provides notification of the information about the own vehicle in step S721. In the case of the present embodiment, the portable terminal TM provides notification that the SIMs have been switched.

In step S706 subsequent to step S705, a process to improve the communication priority concerning the own vehicle CA is executed. Thus, in the case where the portable terminal TM communicates using, for example, a tethering function, the priority on the portable terminal TM side can be lowered relatively.

In step S707 subsequent to step S706, the vehicle control is executed to assist the recognition function using communication.

Figure 22:
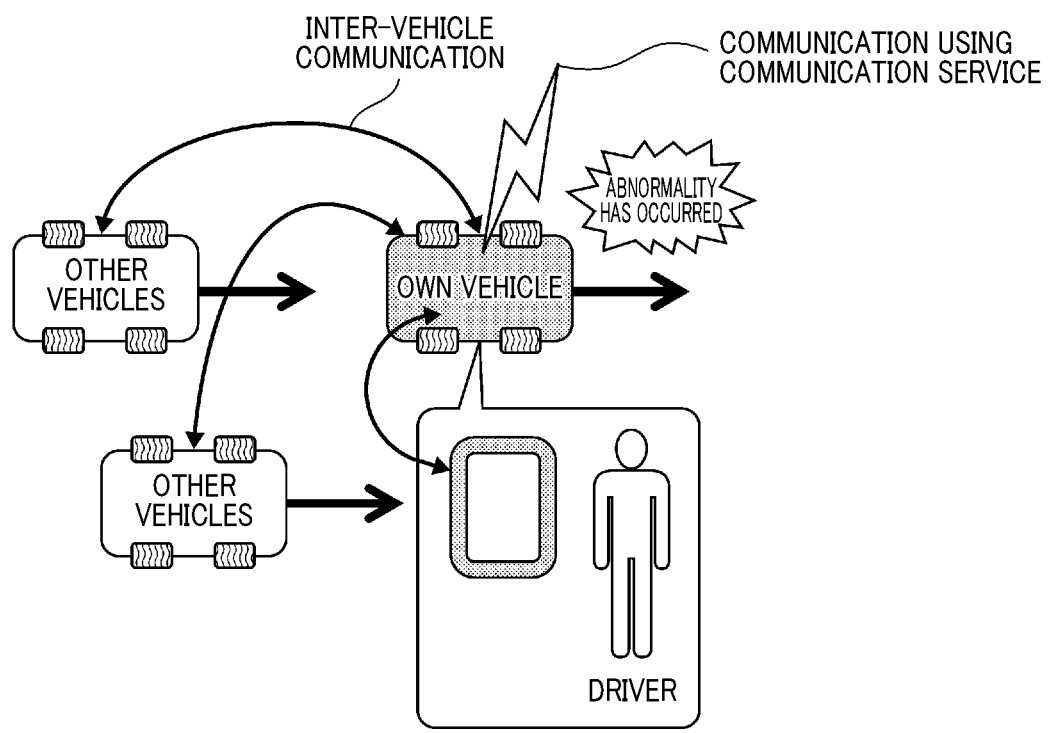
FIG. 22 is another conceptual view for explaining the outline of communication switching.

When communication switching is executed as shown in FIG. 22, the communication means 12 of the own vehicle CA is activated, so that direct communication with the mobile communication network by the communication means 12 becomes possible. The communication details include information such as recognition information from the other vehicles and an infrastructure (map, camera, traffic jam, and vehicle speed), requests to the other vehicles (platooning request and positional relationship request), and driving instructions to the own vehicle (navigation information, lane change, driving, braking and steering).

By execution of such processes, even if a heavy-load process is performed during communication by the portable terminal TM, the procedure of the own vehicle CA with increased priority is performed preferentially. It is possible to rapidly receive information necessary to deal with an abnormality in recognition function, and, even if such an abnormality has occurred, to deal with the abnormality more safely. The communication may be limited to communication for performing a safe procedure, such as control relevant to recognition function and automatic driving control, to enhance the communication priority.

As the method for increasing the priority, the packets may be prioritized, or the transactions within a certain period of communication may be prioritized.

The method example which enables communication by the communication means 12 of the own vehicle CA is not limited to the transfer of the SIM function of the portable terminal TM. It is also possible to directly transfer the preliminarily obtained SIM directly to the own vehicle CA, and to purchase the SIM right when an abnormality has occurred. In these cases, the communication means 40 of the portable terminal TM can continue a state in which it can make effective communication.

Only in the case where there is no other vehicle nearby, the communication means 12 may be activated if an abnormality in recognition has occurred. When there is no other vehicle nearby, the recognition function cannot be assisted through inter-vehicle communication. So, the communication means 12 can be activated to assist the recognition function via the mobile communication network.

When the vehicle stalls or the abnormality is repaired, a non-activation process may be performed (mobile communication is OFF) for control to return the state to the original state in which the portable terminal TM makes direct communication with the mobile communication network.

The embodiments have been described above with reference to the accompanying drawings. However, the present disclosure is not limited to these specific examples. Those obtained by those skilled in the art appropriately adding a design change to these specific examples fall within the scope of the present disclosure as long as they have the characteristic features of the present disclosure. The respective elements provided in the respective specific examples described above and the arrangements, conditions, shapes and the like thereof are not limited to the exemplified ones, and can be appropriately changed. The combination of the respective elements provided in the respective specific examples described above can be appropriately changed as long as no technical contradiction arises.

In the case where an abnormality has occurred in any of the devices that support the recognition of the state of the periphery, for example, the wiper 36, the rain sensor 22, the defogger 37, the defroster 38, and the light 39, it is preferable to perform the above processes when specific conditions are met.

In the case where an abnormality has occurred in the wiper 36 or the rain sensor 22, the above processes are executed when the wiper 36 does not operate during rain. The processes are executed when the wiper 36 stops at a position where the wiper 36 hinders the recognition of the camera constituting the peripheral recognition sensor 21 in the case where an abnormality has occurred in the wiper 36. In the case where at least one of the defogger 37 and the defroster 38 has an abnormality, when an abnormality has occurred in at least one of the defogger 37 and the defroster 38 during fogging, the above processes are executed. In the case where an abnormality has occurred in the light 39, when the illumination intensity detection value by the illumination intensity sensor 25 is equal to or less than the threshold value, the above processes are executed.

What is claimed is:

1. A traveling control device applied to an automatic driving system of a vehicle, the traveling control device comprising:
   a processor programmed to act as:
      a peripheral recognition unit which recognizes a status around an own vehicle;
      an abnormality determination unit which determines whether an abnormality has occurred in a recognition function of the peripheral recognition unit; and
      a control unit which, if the abnormality determination unit has determined that an abnormality has occurred in the recognition function of the peripheral recognition unit, executes procedure modification control to modify an automatic driving procedure in the automatic driving system in accordance with an abnormality recognition direction which is a direction in which the abnormality in the recognition function has occurred, wherein
      the abnormality determination unit executes a platooning determination process to determine whether the own vehicle in which the abnormality has occurred is platooning,
      the control unit executes the procedure modification control in accordance with a result of the platooning determination process,
      in response to the result of the platooning determination process indicating that the own vehicle has been platooning when the abnormality occurred, the control unit
         transmits an arrangement change request to another vehicle platooning with the own vehicle and a different vehicle to change lanes,
         after the another vehicle has changed lanes, adjusts an inter-vehicle distance so that the own vehicle gets closer to the different vehicle to maintain the platoon, and
         while maintaining the platoon, transmits a lane recovery permission to the another vehicle so that the another vehicle returns to original lane to change a position of the own vehicle in the platoon without the own vehicle changing lanes, such that any other vehicle forming the platoon can assist recognition in the abnormality recognition direction, wherein the platoon is continuously maintained from when the another vehicle has changed lanes until after the another vehicle returns to the original lane, and
      in response to the result of the platooning determination process indicating that the own vehicle has not been platooning when the abnormality occurred, the control unit performs control so that the own vehicle forms a new platoon with other vehicle capable of assisting recognition in the abnormality recognition direction of the own vehicle, while the abnormality continues.

2. The traveling control device according to claim 1, wherein
   the control unit executes the procedure modification control in accordance with the abnormality recognition direction and a state of any other vehicle capable of recognizing the abnormality recognition direction.

3. The traveling control device according to claim 2, wherein
   the control unit receives a recognition result in the abnormality recognition direction from the other vehicle, and executes the procedure modification control based on this received recognition result.

4. The traveling control device according to claim 3, wherein
   the control unit receives the recognition result from the other vehicle, and controls a traveling mode of the own vehicle and the other vehicle so that recognition in the abnormality recognition direction can continue to be assisted based on the received recognition result.

5. The traveling control device according to claim 3, wherein
   the control unit receives the recognition result from the other vehicle, and controls a traveling mode of the own vehicle or the other vehicle so that recognition in the abnormality recognition direction can continue to be assisted based on the received recognition result.

6. The traveling control device according to claim 1, wherein
   the control unit causes the own vehicle to change lanes in accordance with the abnormality recognition direction.

7. The traveling control device according to claim 1, wherein
   the control unit outputs platooning request information to request the other vehicle to platoon when detecting any vehicle capable of platooning with the own vehicle.

8. The traveling control device according to claim 7, wherein
   the control unit outputs the platooning request information in consideration of a relationship between the lane on which the own vehicle is traveling and the lane on which the other vehicle is traveling and a speed difference between the own vehicle and the other vehicle.

9. The traveling control device according to claim 7, wherein
the control unit outputs the platooning request information in consideration of a relationship between the lane on which the own vehicle is traveling and the lane on which the other vehicle is traveling or a speed difference between the own vehicle and the other vehicle.

10. The traveling control device according to claim 1, wherein
the control unit stops all the platooning vehicles while they keep the platoon form, and executes a platooning stop process to request the other vehicle to free the platoon.

11. The traveling control device according to claim 10, wherein
the control unit executes the platooning stop process when abnormalities have occurred in a plurality of recognition functions of the own vehicle.

12. The traveling control device according to claim 10, wherein
the control unit executes the platooning stop process when a traveling direction of the own vehicle and a traveling direction of the other vehicle are different from each other.

13. The traveling control device according to claim 1, wherein
when a front recognition abnormality has occurred in the own vehicle, a speed restriction process is executed on the own vehicle;
when a rear recognition abnormality has occurred in the own vehicle, a backward movement restriction process is executed on the own vehicle; and
when any other recognition abnormality has occurred in the own vehicle, a lane change restriction process is executed on the own vehicle.

14. The traveling control device according to claim 1, wherein
in response to the result of the platooning determination process indicating that the own vehicle has not been platooning when the abnormality occurred, the control unit
determines whether any other vehicle is within a predetermined range of the own vehicle, and
upon determining that there is no vehicle within the predetermined range of the own vehicle,
causes an external display of the own vehicle to display that the own vehicle is under automatic driving and the abnormality has occurred in the peripheral recognition unit such that the external display is visible to other vehicles, while the abnormality continues, and
restricts movement of the own vehicle in the abnormality recognition direction.

* * * * *